US009934560B2

(12) United States Patent
Pettigrew et al.

(10) Patent No.: US 9,934,560 B2
(45) Date of Patent: Apr. 3, 2018

(54) USER SLIDERS FOR SIMPLIFIED ADJUSTMENT OF IMAGES

(71) Applicant: Google Inc., Mountain View, CA (US)

(72) Inventors: Daniel Pettigrew, Mountain View, CA (US); Jason Chang, Mountain View, CA (US); Ronald Frank Wotzlaw, Mountain View, CA (US); Sevket Derin Babacan, San Francisco, CA (US); Aravind Krishnaswamy, San Jose, CA (US)

(73) Assignee: Google LLC, Mountain View, CA (US)

( * ) Notice: Subject to any disclaimer, the term of this patent is extended or adjusted under 35 U.S.C. 154(b) by 22 days.

(21) Appl. No.: 15/081,924

(22) Filed: Mar. 27, 2016

(65) Prior Publication Data

US 2016/0284070 A1    Sep. 29, 2016

Related U.S. Application Data

(60) Provisional application No. 62/139,621, filed on Mar. 27, 2015.

(51) Int. Cl.
    *G06K 9/40*        (2006.01)
    *G06T 5/00*        (2006.01)
    (Continued)

(52) U.S. Cl.
    CPC .......... *G06T 5/008* (2013.01); *G06F 3/04845* (2013.01); *G06F 3/04847* (2013.01);
    (Continued)

(58) Field of Classification Search
    CPC ....... G06T 5/008; G06T 5/40; G06K 9/00228; G06K 9/00221; G06K 9/00288;
    (Continued)

(56) References Cited

U.S. PATENT DOCUMENTS 8,345,114 B2 * 1/2013 Ciuc .................. G06K 9/00221
                                            348/222.1
9,384,384 B1 * 7/2016 Tyagi ..................... G06T 11/60
(Continued)

FOREIGN PATENT DOCUMENTS

EP       1453002        9/2004
EP       1612730        1/2006

OTHER PUBLICATIONS

International Search Report and Written Opinion for International Application No. PCT/US2016/024398, dated Jul. 21, 2016, 12 pages.

(Continued)

*Primary Examiner* — Amir Alavi
(74) *Attorney, Agent, or Firm* — Patent Law Works LLP

(57) ABSTRACT

Methods and systems for modifying an image by applying an effect to an image are described. The effects include a pop effect, a light adjustment, or a color adjustment to an image. The methods and systems include providing a user slider for applying an effect to the image. The methods and systems further include determining a first portion of the image including a face and creating a protection mask to protect the face in the first portion during image modification. The protection mask may include an enhancement threshold for modifying the first portion of the image. The modification of the image may include modifying the second portion of the image differently than the first portion of the image. A method for enforcing different resolutions of a same input image to produce similar visual results is also described.

24 Claims, 30 Drawing Sheets

(51) Int. Cl.
*G06F 3/0484* (2013.01)
*G06K 9/00* (2006.01)
*G06T 5/40* (2006.01)
*G11B 27/034* (2006.01)
*G11B 27/34* (2006.01)

(52) U.S. Cl.
CPC .......... *G06K 9/00228* (2013.01); *G06T 5/009* (2013.01); *G06T 5/40* (2013.01); *G11B 27/034* (2013.01); *G11B 27/34* (2013.01)

(58) Field of Classification Search
CPC ........... G06K 9/00222; G06K 9/00287; G06K 9/00281; G06K 9/00248; G06F 3/04845; G06F 3/04847
See application file for complete search history.

(56) References Cited

U.S. PATENT DOCUMENTS

| | | | |
|---|---|---|---|
| 2004/0170337 A1* | 9/2004 | Simon | G06K 9/00234 382/254 |
| 2008/0309796 A1* | 12/2008 | Abe | H04N 5/232 348/231.99 |
| 2010/0302272 A1 | 12/2010 | Reid et al. | |
| 2010/0303348 A1 | 12/2010 | Tolliver et al. | |
| 2011/0187889 A1* | 8/2011 | Hirata | H04N 5/232 348/222.1 |
| 2013/0239057 A1 | 9/2013 | Ubillos et al. | |
| 2014/0328548 A1 | 11/2014 | Carpenter et al. | |
| 2014/0376785 A1* | 12/2014 | Bathiche | G06K 9/00335 382/118 |
| 2015/0347858 A1 | 12/2015 | Johnson et al. | |
| 2016/0284070 A1* | 9/2016 | Pettigrew | G06T 5/008 |

OTHER PUBLICATIONS

Aubry et al. "Fast Local Laplacian Filters: Theory and Applications," ACM Transactions on Graphics, No. 167, vol. 33 Issue 5, Aug. 2014, p. 15.

Paris et al. "Local Laplacian Filters: Edge-aware Image Processing with a Laplacian Pyramid," ACN Transactions on Graphics (Proceedings of SIGGRAPH 2011), vol. 58, No. 3, Mar. 2015, p. 11.

* cited by examiner

USER SLIDERS FOR SIMPLIFIED ADJUSTMENT OF IMAGES

CROSS REFERENCE TO RELATED APPLICATIONS

The present application claims priority, under 35 U.S.C. § 119(e), to U.S. Provisional Patent Application No. 62/139,621, filed Mar. 27, 2015 entitled "User Sliders for Simplified Adjustments of Images," which is incorporated herein by reference in its entirety.

BACKGROUND

Consumers using existing photo editing applications typically want to improve the overall "look" of their digital images. Certain conventional image editing applications provide a myriad of controls that typically consist of a combination of sliders, curves and eye droppers. Although professional photographers know the meaning of these different controls and often have a typical workflow or approach to navigate through the controls, an average user is typically insufficiently familiar with these controls to make the best use of them. The average user is likely to touch every control until the user is somewhat satisfied with the result, but without having the certitude that he/she has applied the optimal combination of sliders and controls manipulations.

In addition, existing photo editing applications fail to provide similar visual results for the same input image at different resolutions. A user upon (a) enhancing the image to bring out the details (applying "pop") and reducing the size of the image, or (b) reducing the size of an original image and then applying "pop," would expect the resulting images after these two operations to look similar. This is especially important in many editing applications since a user may edit on a lower resolution (e.g., screen resolution) image, but their edits may be applied and saved for the original, high resolution image. If the same set of parameters is used for these operations, the results are often not the same in many conventional image editing applications.

Furthermore, existing photo editing applications fail to provide an efficient way to enhance the local contrast and saturation of an image while protecting skin tone or faces in the image. The amount of enhancement performed by these editing apps is often too strong for faces, which leads to undesirable and not very visually appealing results.

SUMMARY

This specification relates to image processing techniques for light adjustment and/or color adjustment of images.

Example implementations provide user interfaces for enabling easy and intuitive color and/or light adjustment and processing in images. According to one aspect of the subject matter described in this disclosure, a system includes a processor; and a memory storing instructions that, when executed, cause the system to: receive an input selecting an image for modification; determine a face in the image; determine a first portion of the image including the face; determine an enhancement threshold of the first portion of the image; provide a user slider for modification of the image; enhance a second portion of the image in response to the user slider being selected to apply an effect, the second portion of the image excluding the first portion; enhance the first portion of the image without exceeding the enhancement threshold in response to the user slider being selected; and store the enhanced image.

In general another aspect of the subject matter described in this disclosure includes a method for applying an effect to an image. The method includes receiving, using one or more computing devices, an input selecting the image for modification; determining, using the one or more computing devices, a face in the image; determining, using the one or more computing devices, a first portion of the image including the face; determining, using the one or more computing devices, an enhancement threshold of the first portion of the image; providing, using the one or more computing devices, a user slider for modification of the image; enhancing, using the one or more computing devices, a second portion of the image in response to the user slider being selected, the second portion of the image excluding the first portion; enhancing, using the one or more computing devices, the first portion of the image without exceeding the enhancement threshold in response to the user slider being selected; and storing, using the one or more computing devices, the enhanced image.

Other implementations of one or more of these aspects include corresponding systems, apparatus, and computer programs, configured to perform the actions of the methods, encoded on computer storage devices.

These and other implementations may each optionally include one or more of the following features. For instance, the operations further include where the effect is a pop effect, the user slider controls the pop effect, and the methods include determining, using the one or more computing devices, an amount of the pop effect to apply to the image based on the user slider; adjusting, using the one or more computing devices, the image by applying the pop effect to the first portion of the image; and applying, using the one or more computing devices, the pop effect to the second portion of the image based on the user slider. For instance, the pop effect includes one of the group of a saturation boost, a brightness adjustment, and use of a local contrast to enhance details of the image.

For instance, the operations further include where the effect is a light adjustment, the user slider controls the light adjustment to the image, and the methods include extending, using the one or more computing devices, a histogram range to include an available range for light adjustment and to spread out distributions based on a desired light adjustment amount selected using the user slider; adjusting, using the one or more computing devices, shadow or highlight details associated with the image based on the desired light adjustment amount; and adjusting, using the one or more computing devices, gamma associated with the image based on the desired light adjustment amount.

For instance, wherein the modification is resizing the image into a fixed lower resolution image, the operations further include determining, using the one or more computing devices, a color in the image that is saturated; and saturating, using the one or more computing devices, the second portion of the image based on the color adjustment amount selected using the user slider.

In general, another aspect of the subject matter disclosed in this disclosure may be embodied in methods that include determining, using the one or more computing devices, a number of pyramid levels to match some pre-defined fixed lower resolution image; selecting, using the one or more computing devices, a remapping level to be a fixed offset from a top level of the pyramid levels; and applying, using the one or more computing devices, a local Laplacian smoothing to ensure similar frequency bands are processed for differently-sized images to produce similar visual results for the fixed lower resolution image.

For instance, the features may include providing a user slider for modification of the image having a pop slider, a color slider, a light slider, and a preview of the image.

The present invention is directed toward the technical problem of improving the image quality of images despite their resolution. More specifically, the present invention solves the technical challenge of producing images of high visual quality and reducing the complexity of manual setting image corrections by users. The present invention advantageously includes a set of sliders that use image analysis to determine operations to perform for image enhancement to solve the complexity of control problem. One advantage of these sliders is to capture the mindset of a professional photographer, and replicate his typical workflow as the user manipulates the sliders for enhancing an image. Yet another advantage of the present invention is that it includes an efficient way to enforce different resolutions of a same input image to produce similar visual results. Still a further advantage is that the present invention includes unique blending and masking techniques to protect faces in an image from too much enhancement and producing more visually appealing results.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
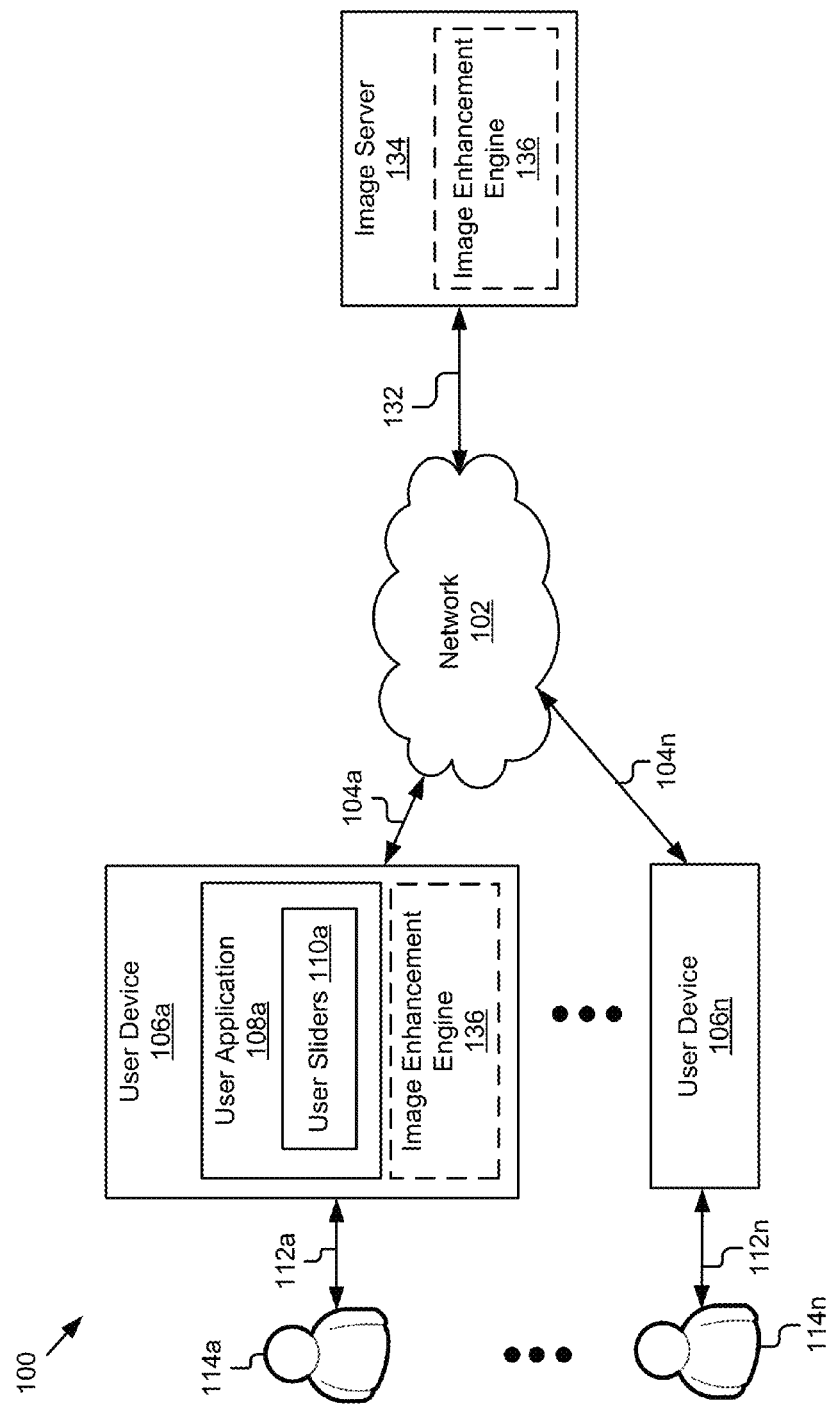
FIG. 1 is a block diagram illustrating an example system for enhancing an image using user sliders.

Existing photo editing applications suffer from certain technical problems. Existing photo editing user interfaces with numerous controls may be confusing for the average user. The average user, using various existing controls, may not have the certitude that they have applied the optimal combination of edits to an image. Certain existing photo editing applications fail to provide similar visual results for an input image at different resolutions. Certain existing photo editing applications apply edits to an entire image, often resulting in edits that are too strong for faces included in the image.

In certain implementations, a computer system and a computer-executed method are provided that include a technical solution to the technical problems discussed above. Specifically, the computer system and the computer executed method implement one or more image processing or editing user interfaces that are intuitive and fairly simple to use, and that enable the user to achieve a desired "look" of their image (e.g., more or less bright, more or less colorful, etc.). The example system or method receives user input via one or more sliders (a user either moves the slider to the left or to the right), analyzes the image, and enhances the image based on the user input and the analysis. The enhancement is determined based on the image analysis and the details of the image (e.g. light, shadows, colors, contrast, etc.)

In certain implementations, a computer system and a computer-executed method provide an efficient way to enforce that image editing of the same image at different resolutions generates substantially the same visual result. This is done by determining a number of pyramid levels to match a fixed lowest resolution image (e.g., 100×100) and then choosing a remapping level to be a fixed offset from the top of the pyramid. This ensures that the similar frequency bands are processed for differently-sized images, which eventually produces similar results for different resolution images. It should be understood that different numbers of pyramid levels to may be used depending on the fixed lowest resolution image.

In certain implementations, a computer system and a computer-executed method enable unique blending and masking techniques to protect faces in an image from too much enhancement and produces more visually appealing results. The system and method described herein achieves this by limiting the amount of pop effect on a particular portion of an image (e.g., a human face) while allowing the effect to take its full effect on pixels away from the face. In some implementations, a blurred geometric shape (e.g., rectangle, oval, etc.) is used over and/or around the face to limit the effect. An exemplary blurred rectangle is generated by blurring the face bounding box with a box filter. The resulting convolution can be computed in a closed form. From signal processing theory, blurring a rectangle with another rectangle will result in a trapezoid. The value at any point for the output may be only dependent on the distance to the rectangle, which can be computed in constant time per pixel, regardless of the blur kernel size. In certain other implementations, a different geometric shape (e.g., oval, circle) may be used to protect a particular portion of an image. In certain implementations, the shape may be generated based on object or face detection performed on the image. For example, a portion of the image that is determined to contain a face may be specified as the shape over which to limit the pop effect.

FIG. 1 illustrates a block diagram of an example system 100 for enhancing an image using user sliders. The system 100 as illustrated has user (or client) devices 106a through 106n typically utilized by users 114a through 114n to access servers hosting websites via networks. The system 100 may include an image server 134 for enhancing, processing and storing images. In the illustrated example, these entities are communicatively coupled via a network 102.

It should be recognized that in FIG. 1 as well as other figures used to illustrate the technology, an indication of a letter after a reference number or numeral, for example, "106a" is a specific reference to the element or component that is designated by that particular reference numeral. In the event a reference numeral appears in the text without a letter following it, for example, "106," it should be recognized that such is a general reference to different implementations of the element or component bearing that general reference numeral. Moreover, though only two user devices are illustrated in FIG. 1, persons of ordinary skill in the art will recognize that any number of client devices 106n may be used by any number of users 114n.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some implementations, the network 102 may be a peer-to-peer network. The network 102 may also be coupled to or include portions of a telecommunications network for sending data in a variety of different communication protocols. In some other implementations, the network 102 includes Bluetooth communication networks or a cellular communications network for sending and receiving data including via short messaging service (SMS), multimedia messaging service (MMS), hypertext transfer protocol (HTTP), direct data connection, wireless application protocol (WAP), email, etc. In addition, although FIG. 1 illustrates a single network 102 coupled to the user devices 106 that are illustrated and the image server 134, in practice, one or more networks 102 may be connected to these entities.

The user devices 106a through 106n in FIG. 1 are used by way of example. Although only two user devices 106 are illustrated, the disclosure applies to a system architecture having any number of user devices 106 available to any number of users 114. In the illustrated implementation, the users 114a through 114n interact with the user device 106a and 106n, via signal lines 112a through 112n, respectively. The user devices 106a through 106n are communicatively coupled to the network 102 via signal lines 104a through 104n respectively.

In some implementations, the user device 106 (any or all of 106a through 106n) can be any computing device that includes a memory and a processor. For example, the user device 106 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 102, etc.

In some implementations, the user devices 106a through 106n comprise a user application 108 (illustrated as 108a through 108n) and an image enhancement engine 136. The user 114 (114a through 114n) uses the user application 108 to exchange information with the image enhancement engine 136, and the image server 134, as appropriate to accomplish the operations of the present technology. As one example, the user 114 may make light and/or color adjustments to an image using user sliders 110a included in the user application 108a, and may receive results based on those adjustments from the image enhancement engine 136, via the user application 108. Further acts and/or functionalities of the user application 108 are described in further detail below with respect to at least FIG. 2.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, the user application 108 requires that the user consent to allow the user application 108 and/or other components discussed elsewhere herein to process information and images. If the user fails to consent, the user application 108 does not process any information related to the user.

The image server 134 may be a computing device that includes a processor, a memory and network communication capabilities. The image server 134 is coupled to the network 102, via a signal line 132. The image server 134 may be configured to obtain a plurality of images for enhancement from the user devices 106 (106a through 106n), via the network 102. Although only one image server 134 is shown, persons of ordinary skill in the art will recognize that multiple servers may be used, either in a distributed architecture or otherwise. For the purpose of this application, the system configuration and operations performed by the system are described in the context of a single image server 134.

In some implementations, the image server 134 comprises an image enhancement engine 136 for image enhancement. The image enhancement engine 136 may receive user input on a user slider 110 from the user application 108, and then modify an image based on the received user input on the slider 110. For example, the user 114 using a light adjustment slider may provide input to brighten up an image, and the image enhancement engine 136 may analyze the image and brighten it based on the desired user input received on the light adjustment slider. By way of another example, the user 114 using a color adjustment slider may provide input to saturate an image, and the image enhancement engine 136 may analyze the image and saturate it based on the desired user input received on the color adjustment slider. Numerous other examples are also possible and contemplated.

As depicted in FIG. 1, the image enhancement engine 136 is shown in dotted lines to indicate that the operations performed by the image enhancement engine 136 as described herein can be performed either server-side (e.g., image server 134) or user-side (e.g., user devices 106a through 106n), or a combination of the two. Additional structure, acts, and/or functionality of the image enhancement engine 136 is described in further detail below with respect to at least FIG. 2.

Figure 2:
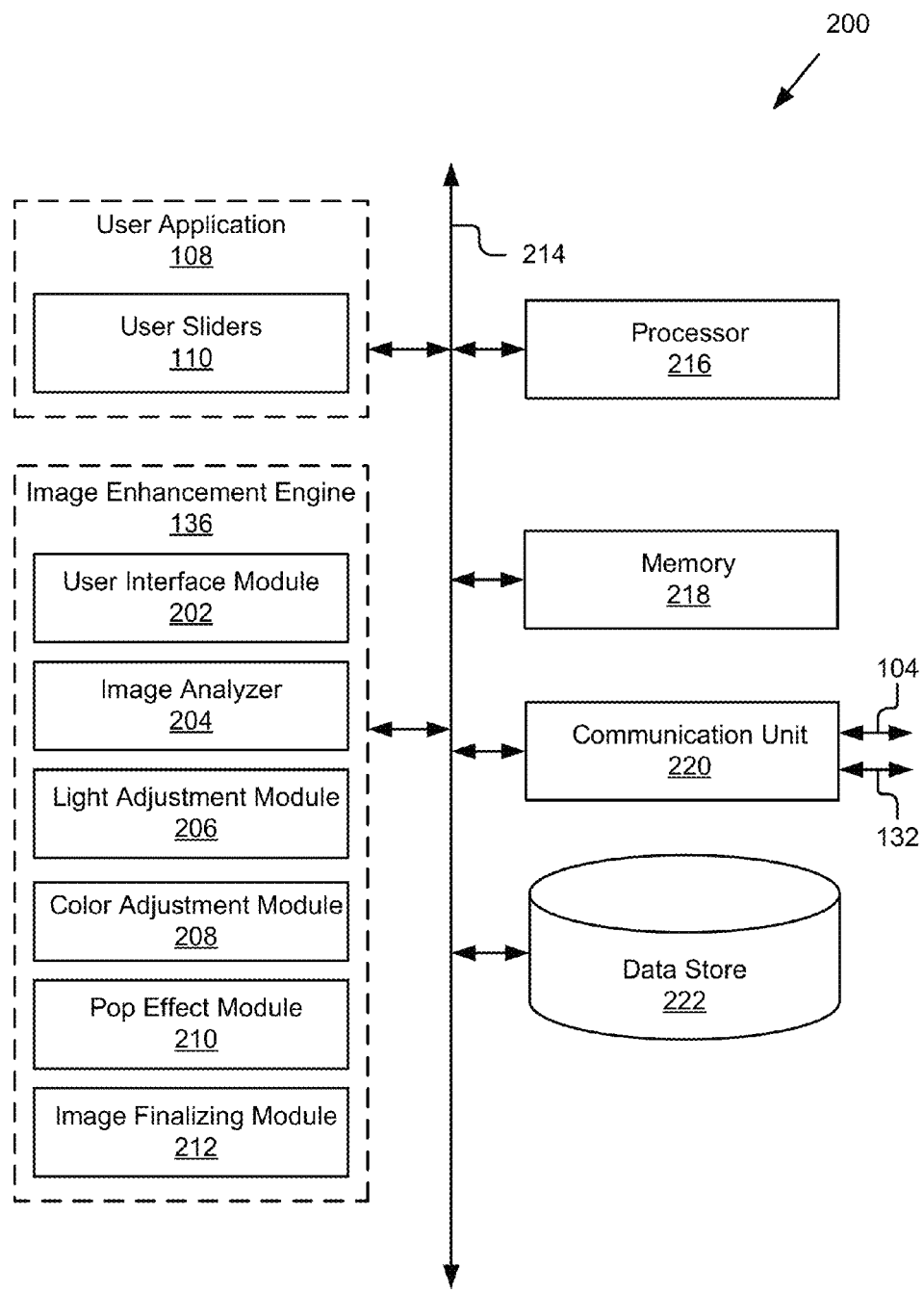
FIG. 2 is a block diagram illustrating an example computing device.

FIG. 2 is a block diagram of an example computing device 200, which may be representative of a computing device included in the image server 134 and/or the user device 106. As depicted, the computing device 200 may include a processor 216, a memory 218, a communication unit 220, a data store 222, one or more of a user application 108, and an image enhancement engine 136, which may be communicatively coupled by a communication bus 214.

Depending upon the configuration, the computing device 200 may include differing components. For instance, in a server-side implementation, the computing device 200 may include the image enhancement engine 136. In an example client-side implementation, the computing device 200 may include the user application 108, and/or the image enhancement engine 136. It should be understood that the above configurations are provided by way of example and numerous further configurations are contemplated and possible.

The processor 216 may execute software instructions by performing various input, logical, and/or mathematical operations. The processor 216 may have various computing architectures to method data signals including, for example, a complex instruction set computer (CISC) architecture, a reduced instruction set computer (RISC) architecture, and/or an architecture implementing a combination of instruction sets. The processor 216 may be physical and/or virtual, and may include a single core or plurality of processing units and/or cores. In some implementations, the processor 216 may be capable of generating and providing electronic display signals to a display device, supporting the display of images, capturing and transmitting images, performing complex tasks including various types of feature extraction and sampling, etc. In some implementations, the processor 216 may be coupled to the memory 218 via the bus 214 to access data and instructions therefrom and store data therein. The bus 214 may couple the processor 216 to the other components of the computing device 200 including, for example, the memory 218, communication unit 220, and the data store 222.

The memory 218 may store and provide access to data to the other components of the computing device 200. In some implementations, the memory 218 may store instructions and/or data that may be executed by the processor 216. The memory 218 is also capable of storing other instructions and data, including, for example, an operating system, hardware drivers, other software applications, databases, etc. The memory 218 may be coupled to the bus 214 for communication with the processor 216 and the other components of the computing device 200.

The memory 218 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 216. In some implementations, the memory 218 may include one or more of volatile memory and non-volatile memory (e.g., RAM, ROM, hard disk, optical disk, etc.). It should be understood that the memory 218 may be a single device or may include multiple types of devices and configurations.

The bus 214 can include a communication bus for transferring data between components of a computing device or between computing devices, a network bus system including the network 102 or portions thereof, a processor mesh, a combination thereof, etc. In some implementations, the user application 108 and the image enhancement engine 136 may cooperate and communicate via a software communication mechanism implemented in association with the bus 214. The software communication mechanism can include and/or facilitate, for example, inter-process communication, local function or procedure calls, remote procedure calls, network-based communication, secure communication, etc.

The communication unit 220 may include one or more interface devices for wired and wireless connectivity with the network 102 and the other entities and/or components of the system 100 including, for example, the user devices 106, the image server 134, and the data store 222, etc. For instance, the communication unit 220 may include, but is not limited to, CAT-type interfaces; wireless transceivers for sending and receiving signals using Wi-Fi; Bluetooth, cellular communications, etc.; USB interfaces; various combinations thereof; etc. The communication unit 220 may be coupled to the network 102 via the signal lines 104 and 132. In some implementations, the communication unit 220 can link the processor 216 to the network 102, which may in turn be coupled to other processing systems. The communication unit 220 can provide other connections to the network 102 and to other entities of the system 100 using various standard communication protocols, including, for example, those discussed elsewhere herein.

The data store 222 is an information source for storing and providing access to data. In some implementations, the data store 222 may be coupled to the components 216, 218, 220, 108, and/or 136 of the computing device 200 via the bus 214 to receive and provide access to data. In some implementations, the data store 222 may store data received from the other entities 106 and/or 134 of the system 100, and provide data access to these entities. The data store 222 can include one or more non-transitory computer-readable media for storing the data. In some implementations, the data store 222 may be incorporated with the memory 218 or may be distinct therefrom. In some implementations, the data store 222 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In some implementations, the data store 222 may store an enhanced image after the image has been altered using the user sliders 110.

As depicted, the user application 108 includes user sliders 110. The user sliders 110 may include a combination of one or more of a light adjustment slider, a color adjustment slider, and a pop adjustment slider. The light adjustment slider can be a slider to increase/decrease a brightness of an image as shown, for example, in FIG. 6B. The color adjustment slider can be a slider to saturate/de-saturate an image as shown, for example, in FIG. 6C. The pop adjustment slider can be a slider to boost saturation and brightness in an image as shown, for example, in FIG. 16.

In some implementations, each of these sliders 110 may perform its operation discussed herein in cooperation with one or more components of the image enhancement engine 136. For instance, the light adjustment slider may increase/decrease a brightness of an image in cooperation with the user interface module 202, the image analyzer 204, the light adjustment module 206, and the image finalizing module 212 of the image enhancement engine 136. The color adjustment slider may saturate/de-saturate an image in cooperation with the user interface module 202, the image analyzer 204, the color adjustment module 208, and the image finalizing module 212 of the image enhancement engine 136.

As depicted, the image enhancement engine 136 includes a user interface module 202, an image analyzer 204, a light adjustment module 206, a color adjustment module 208, a pop effect module 210, and an image finalizing module 212. The components 202, 204, 206, 208, 210, and 212 of the image enhancement engine 136 are coupled for communication with each other and the other components 108, 110, 216, 218, and 220 of the computing device 200. The components 202, 204, 206, 208, 210, and 212 are also coupled to the network 102 via the communication unit 220 for communication with the other entities of the system 100.

In some implementations, the user interface module 202, the image analyzer 204, the light adjustment module 206, the color adjustment module 208, the pop effect module 210, and the image finalizing module 212 are sets of instructions executable by the processor 216 to provide their respective acts and/or functionality. In other implementations, the user interface module 202, the image analyzer 204, the light adjustment module 206, the color adjustment module 208, the pop effect module 210, and the image finalizing module 212 are stored in the memory 218 of the computing device 200 and are accessible and executable by the processor 216 to provide their respective acts and/or functionality. In any of these implementations, the user interface module 202, the image analyzer 204, the light adjustment module 206, the color adjustment module 208, the pop effect module 210, and the image finalizing module 212 may be adapted for cooperation and communication with the processor 216 and other components 108, 110, 218, and 220 of the computing device 200.

The user interface module 202 may be steps, process, functionalities or a device for performing them including routines for receiving user inputs from user sliders 110 and then sending those inputs to one or more other components of the image enhancement engine 136 to perform their respective acts and/or functionalities thereon. In some implementations, a user input from a user slider 110 may include, for example, an input adjusting the lighting of an image using a light adjustment slider, an input adjusting the color of an image using a color adjustment slider, and an input adjusting the pop effect of an image using a pop adjustment slider. In some implementations, the user interface module 202 may also be configured to receive image enhancement results from other components of the image enhancement engine 136 and then provide an image based on those results for display to the user.

The image analyzer 204 may be steps, process, functionalities or a device for performing them including routines for analyzing an image that has been selected by a user for image enhancement. In some implementations, analyzing the image may include determining current lighting details associated with the image, current color details (e.g., what colors in the image are already saturated vs. non-saturated, whether the image is over-saturated, intensity of saturation in the image, etc.) associated with the image, one or more protecting regions (e.g., skin tones in the image, one or more people present in the image, etc.) associated with the image, etc. In some implementations, the image analyzer may send the results of its analysis to the light adjustment module 206, the color adjustment module 208, the pop effect module 210, and/or the image finalizing module 212, which may then use those results to base their operations thereon.

The light adjustment module 206 may be steps, process, functionalities or a device for performing them including routines for adjusting the lighting of an image. In some implementations, adjusting the lighting of the image may include brightening or darkening the image as discussed elsewhere herein. In some implementations, the light adjustment module 206 may brighten the image based on the image analyzer determining the lighting details of the image. The light adjustment module 206 may brighten the image by 1) extending range of the histogram associated with the image to widely spread out the distributions and occupy the available range for light adjustment, 2) adjusting the shadow details associated with the image, or 3) applying a gamma boost or correction, as discussed, for example, in FIGS. 3D and 8. Shadow adjustment refers to performing image processing to correct exposure (amount of light per unit area). Gamma is a nonlinear operation used to adjust luminance or tristimulus values in video or still images. The light adjustment module 206 may perform its operation described herein in cooperation with the user inputs received on a light adjustment slider.

In some implementations, the light adjustment module 206 may darken the image based on the image analyzer determining the lighting details of the image. The light adjustment module 206 may darken the image by 1) extending range of the histogram associated with the image to widely spread out the distributions and occupy all the available range for light adjustment, 2) adjusting the highlight details associated with the image, or 3) decreasing the gamma associated with the image, as discussed, for example, in FIGS. 3D and 11. In some implementations, once the light adjustment module 206 is done performing its light adjustment described herein, the light adjustment module 206 may send its light adjustments to the image finalizing module 212, which may then use those adjustments and other further adjustments to finalize the image for display to the user.

The color adjustment module 208 may be steps, process, functionalities or a device for performing them including routines for adjusting colors of an image. In some implementations, adjusting the colors of the image may include saturating or de-saturating the image as discussed elsewhere herein. In some implementations, the color adjustment module 208 may saturate or de-saturate the image based on a user's current position in the color adjustment slider. The color adjustment module 208 may receive the user's current position in the slider from the user interface module 202, which is communicatively coupled to the user sliders 110 to receive user input(s) on a slider.

If the user's current position in the slider is beyond the mid-point position in a first direction (e.g., right, or up), the color adjustment module 208 may determine that the user intends to saturate the image and may then saturate the image by 1) saturating the colors in the image that are not already saturated and/or 2) protecting the skin tone of people in the images during saturation. If on the other hand, the user's current position in the slider is beyond the mid-point position in a second direction (e.g., left or down), the color adjustment module 208 may determine that the user intends to de-saturate the image and may then de-saturate the image by de-saturating the colors in the image that are not already de-saturated based on the amount of de-saturation reflected by the user's current position in the slider. In some implementations, once the color adjustment module 208 has completed performing its color adjustment described herein, the color adjustment module 208 may send its color adjustments to the image finalizing module 212, which may then use those adjustments and other further adjustments to finalize the image for display to the user.

The pop effect module 210 may be steps, process, functionalities or a device for performing them including routines for applying a pop effect to an image. Applying a pop effect may include adding a saturation boost to the image, adjusting the brightness of the image, or using a local contrast to enhance the details of the image. In some implementations, the pop effect may be applied prior to light adjustments and/or color adjustments performed by the light adjustment module 206 and/or the color adjustment module 208. In other implementations, the pop effect may be applied at any time during the course of image enhancement. In some implementations, once the pop effect module 210 is completed applying its pop effect described herein, the pop effect module 210 may send the pop effects to the image finalizing module 212, which may then use those effects and other further adjustments to finalize the image for display to the user. Additional description regarding the pop effect is further discussed below with respect to at least FIGS. 3B, 3C, 4, and 5.

The image finalizing module 212 may be steps, process, functionalities or a device for performing them including routines for finalizing an image for display to a user. In some implementations, the image finalizing module 212 may finalize the image based on light, color, and/or pop adjustments done by the light adjustment module 206, the color adjustment module 208, and the pop effect module 210, respectively, and then apply a hue constant rendering intent if required to the image, as discussed, for example, in FIG. 18. In some implementations, the image finalizing module 212 may apply some other filters or image enhancement techniques to further enhance the image. Once the image is finalized, the image finalizing module 212 may send the finalized image to the user interface module 202, which may then provide it for user display.

Additional structure, acts, and/or functionality of the user interface module 202, the image analyzer 204, the light adjustment module 206, the color adjustment module 208, the pop effect module 210, and the image finalizing module 212 are further described below with respect to at least FIGS. 3A-3E, and FIGS. 4 and 5.

Methods

FIGS. 3A-3E are flowcharts illustrating an example method 300 for enhancing an image using user sliders. The method 300 begins by receiving 302 a user input selecting an image for enhancement and providing 304 a set of user sliders including a light adjustment slider, a color adjustment slider, and a pop effect slider for display to a user. In some implementations, the operations in the blocks 302 and 304 may be performed by the user application 108 or in different orders. For example, the user application may be a photo application installed on a user device 106 and the photo app, upon receiving the user selection for image enhancement, may provide the user sliders for display to the user as depicted, for example, in FIG. 6A.

The method 300 continues by receiving 306 another user input selecting a desired slider from the set of user sliders displayed to the user. In some implementations, input from more than one slider may be received. The method 300 may then determine in blocks 308, 310, and 312, whether the user selection is the pop effect slider, the light adjustment slider, or the color adjustment slider, respectively. It should be understood that these blocks 308, 310, and 312 could be performed in other orders different than shown in FIG. 3A. For example, block 310 may be performed before block 308. If the result of the determination is the pop effect slider, then the method 300 may proceed to block 316 (see FIG. 3B) to analyze the image and determine in block 318 whether the image includes any protection region. A protection region is a region of the image in which the enhancements will not be applied or applied differently that the remainder of the image. In some implementations, the protection region is defined automatically, while in other it is defined manually based on user input. In some implementations, the protection region need not include faces but is fully user definable. For instance, the method 300 may determine via facial detection in block 318 if the image includes any human faces and if there are, then apply the pop effect in a way to protect the facial region. In some implementations, the pop effect may be applied to protect the facial region by applying the pop effect up to a pre-determined threshold in the facial region. In certain cases, the pop effect may be applied to a first extent in the facial regions and to a second different extent in regions of the image lacking any human faces. The first extent may be lower than the second extent in some cases. For example, the same amount of pop effect may be applied to both the facial region and the non-facial regions of the image up to a specific level, and then the pop effect may continue to be applied to the rest of the image, while the facial region pop effect stays at the specific level. In some implementations, the pop effect may be applied gradually to different areas of the boundary around the facial region. These regions can be defined by a protection mask. A protection mask is a general boundary that matches the protection regions and in which the enhancements will not be applied or applied differently. For example, with respect to FIG. 23, the protection mask 2302 is not a hard boundary but gradually fades from the protection mask to the rest of the image.

If the method 300 determines that the pixels of the image are not a part of the protected region, the method 300 may simply proceed to boost 320 saturation if required to those pixels, adjust 322 brightness (i.e., increase/decrease) if required to those pixels, and use 324 local contrast to enhance the details of the non-protected region as discussed elsewhere herein. If on the other hand, the method 300 determines pixels are within a protected region in the image in block 318, then the method 300 may boost 326 saturation of this region only up to a certain predetermined threshold, may adjust 328 the brightness of this region only up to a certain predetermined threshold, and may use 330 the local contrast to enhance the details of this region only up to a certain predetermined threshold. This is done to brighten the image to only a certain level and to keep the skin tones of the people identified in the images unchanged.

In some implementations, the method 300 may still apply a pop effect to the protected region but at a second predetermined level different from first level applied to the unprotected region, which may still keep the protected region with appropriate enhancement levels but different than the rest of the image (for example, keep the colors that are equivalent to the skin tone and realistic in appearance). This is further illustrated in FIG. 3C. Referring now to FIG. 3C, if the method 300 determines a protected region to be present in the image analyzed in block 316, the method 300 may boost 332 saturation at a second predetermined rate within the protected region, may adjust 334 brightness at a second predetermined rate within the protected region, and may use 336 local contrast to enhance the details of the image at a second predetermined rate within the protected region. In some implementations, the operations in the blocks depicted in FIGS. 3B and 3C are performed by the image analyzer 204 and the pop effect module 210 in cooperation with a pop adjustment slider included in the user sliders 110.

Returning to FIG. 3A, if the result of the determination is the light adjustment slider, then the method 300 may proceed to determine in blocks 338 or 340 (see FIG. 3D) whether to brighten the image or darken the image, respectively. If the method 300 determines to brighten 338 the image, the method 300 may proceed and adjust 341 highlight details in the image based on the user's current cursor position in the light adjustment slider. Next, the method 300 may extend 342 histogram range to use all the available range based on the user's current cursor position in the light adjustment slider (e.g., see FIGS. 8, 10A, 11, and 13). The method 300 continues to adjust 344 shadow details in the image and then apply 346 a gamma boost for color correction based on the user's current cursor position in the light adjustment slider as discussed elsewhere herein. For example, the gamma boost may be parameter values to translate human perception of an image and the luminance of the image. This adjust tonal levels into ones that are more perceptively uniform.

If on the other hand, the method 300 determines to darken 340 the image, the method 300 may proceed to extend 348 the histogram range to use all the available range based on the user's current cursor position in the light adjustment slider as discussed above. The method 300 may then adjust 350 highlight details in the image and decrease 352 the gamma based on the user's current cursor position in the light adjustment slider as shown, for example, in FIG. 11. In some implementations, the operations in the blocks depicted in FIG. 3D are performed by the light adjustment module 206 in cooperation with a light adjustment slider included in the user sliders 110.

Returning to FIG. 3A, if the result of the determination is the color adjustment slider, then the method 300 may proceed to block 354 (see FIG. 3E) to analyze the image and then determine 356 user's current cursor position in the color adjustment slider. Responsive to determining the user's current cursor position in the slider, the method 300 may determine in blocks 358 and 360, whether the cursor position is in a first direction or a second direction from the mid-point position in the slider, respectively. The method 300 may make this determination to decide whether to saturate or de-saturate the image. For instance, if the method 300 determines the cursor position to be higher than the mid-point position in block 358, the method 300 may determine 362 whether color in the image is equivalent to skin tone color and then saturate 364 the image excluding the already saturated colors and protecting the skin color of one or more people in the images based on the user's current cursor position in the color adjustment slider. In some implementations, the method 300 may apply saturation to the skin color up to a pre-determined threshold. For example, if the skin tone is faded (e.g., below a saturation level for skin tones), then a saturation may be applied to the skin tone and the skin tone color may be saturated to the same level as the other colors in the image. In another example, the skin tone may be saturated at one level and the rest of the image colors may be saturated to a different level. If on the other hand, the method 300 determines the cursor position to be lower than the mid-point position in block 360, then the method 300 may de-saturate 366 the image based on the user's current cursor position in the color adjustment slider as discussed elsewhere herein. In some implementations, the operations in the blocks depicted in FIG. 3E are performed by the image analyzer 204 and the color adjustment module 208 in cooperation with a color adjustment slider included in the user sliders 110.

Figure 3A:
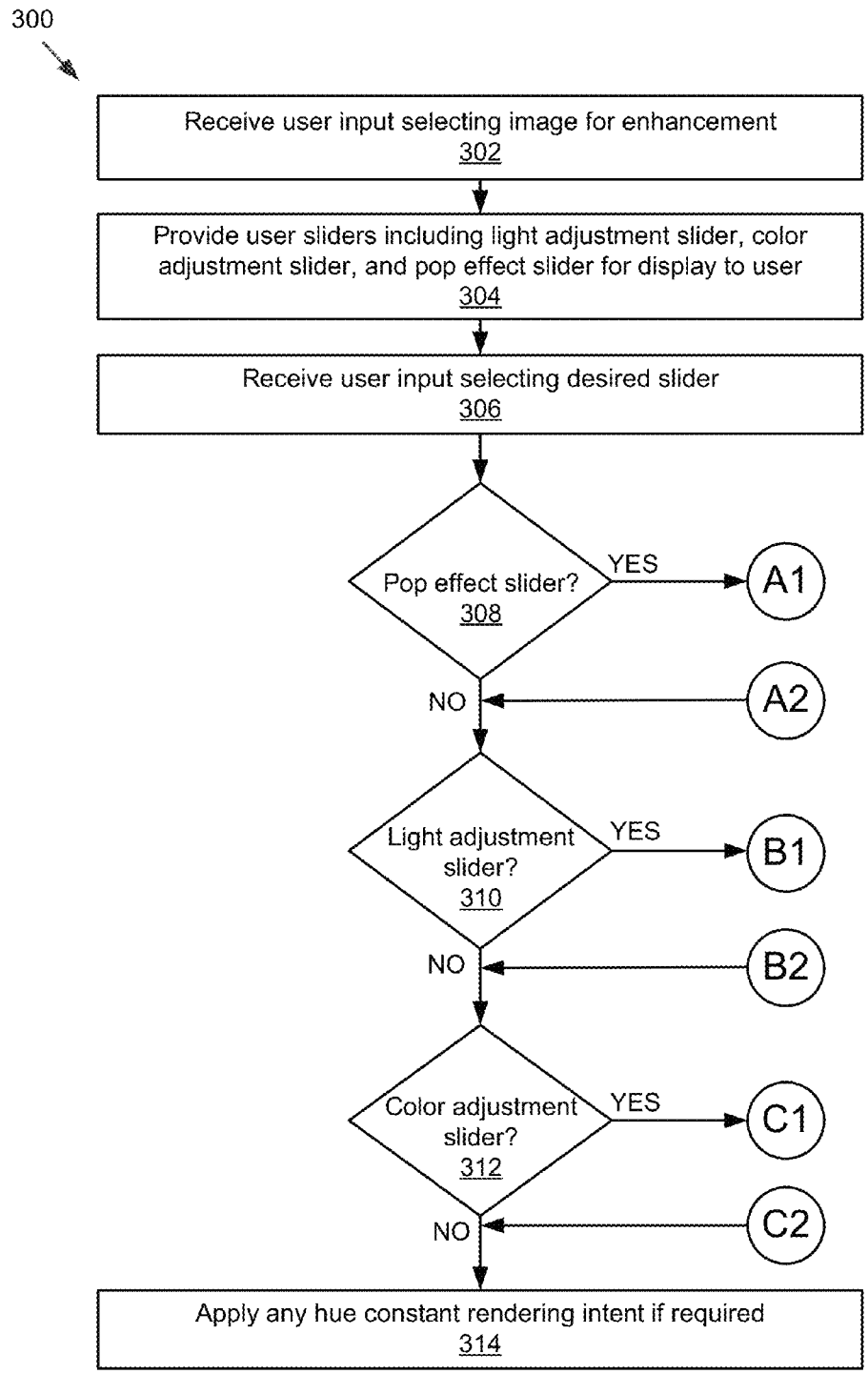
FIGS. 3A-3E are flowcharts illustrating an example method for enhancing an image using user sliders.
Figure 3B:
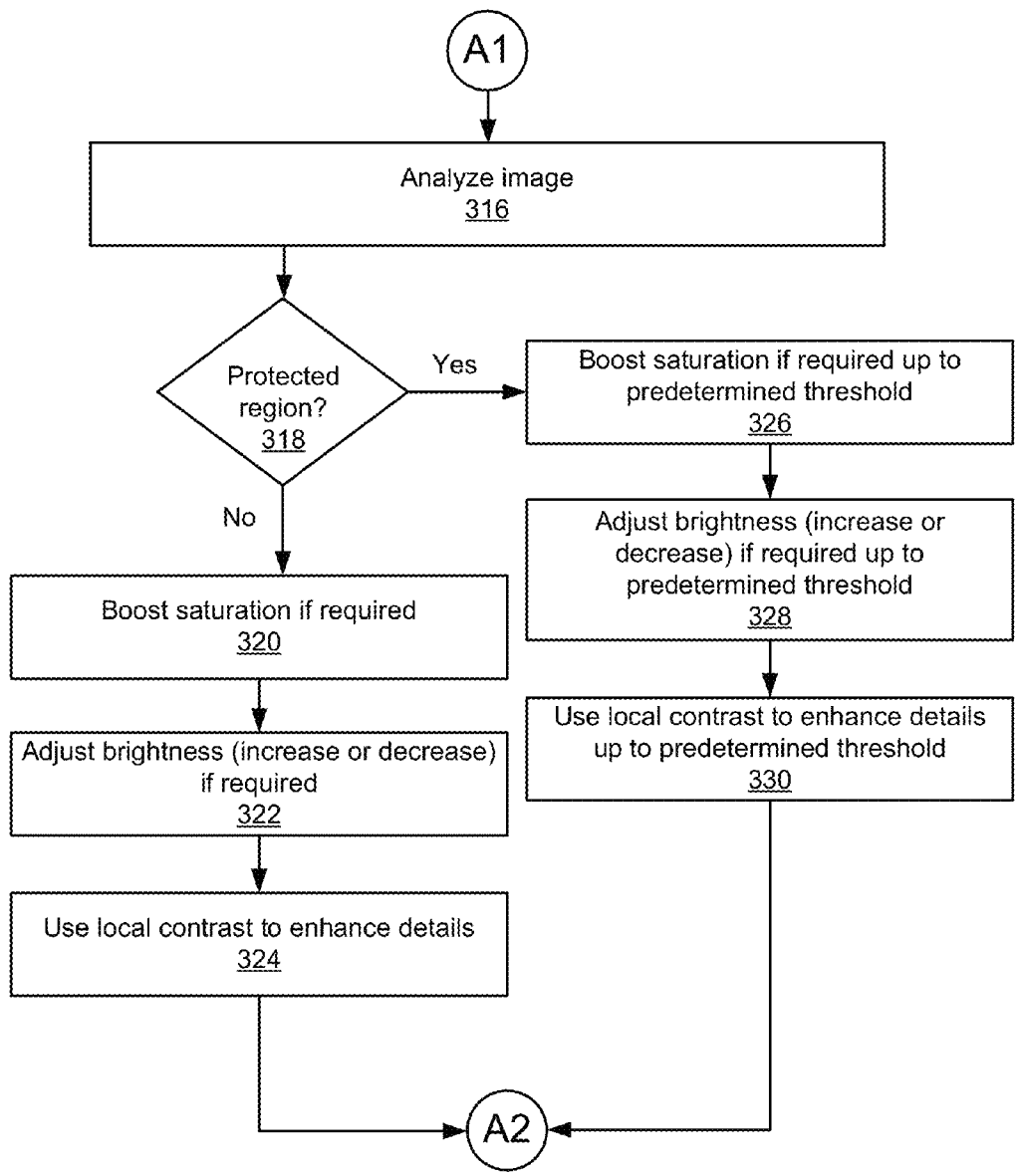
Figure 3C:
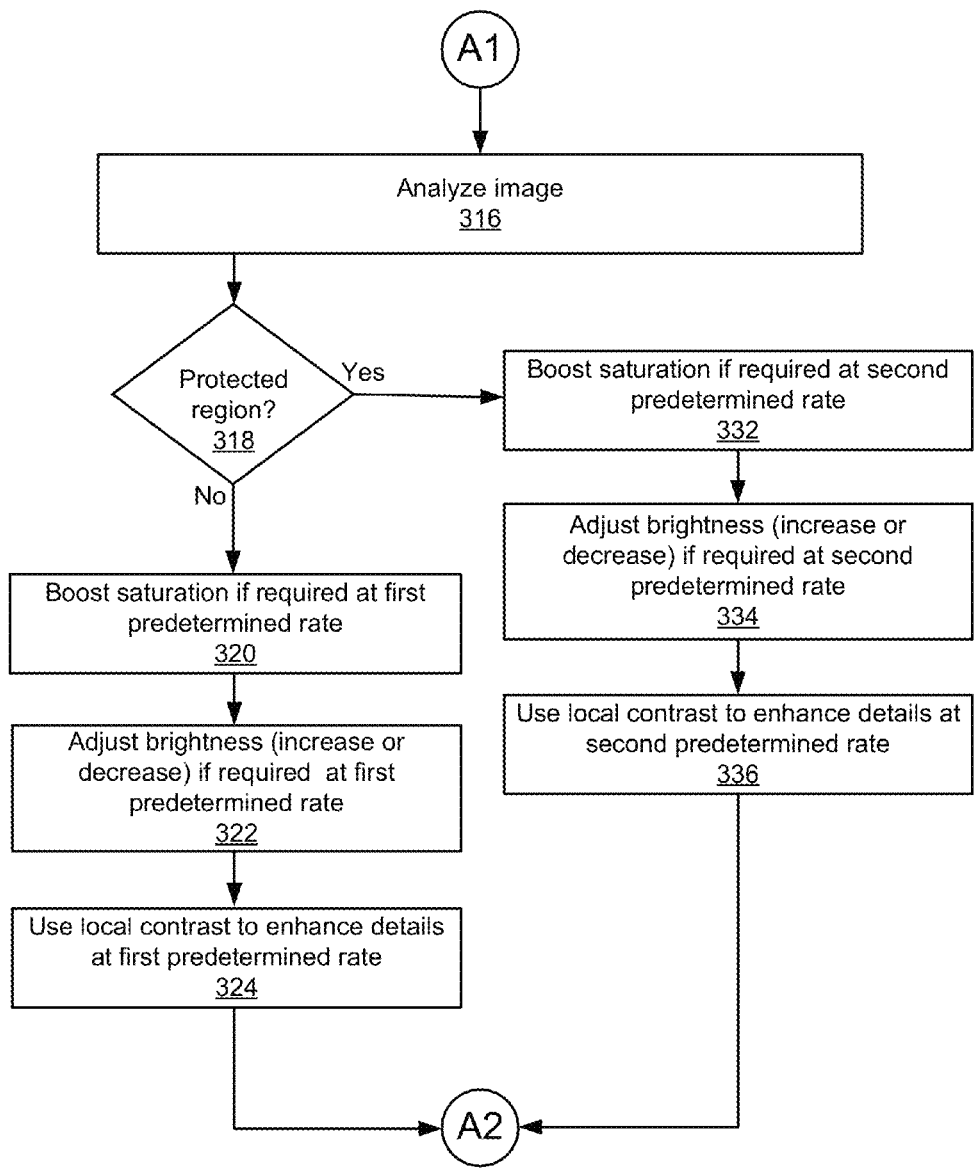
Figure 3D:
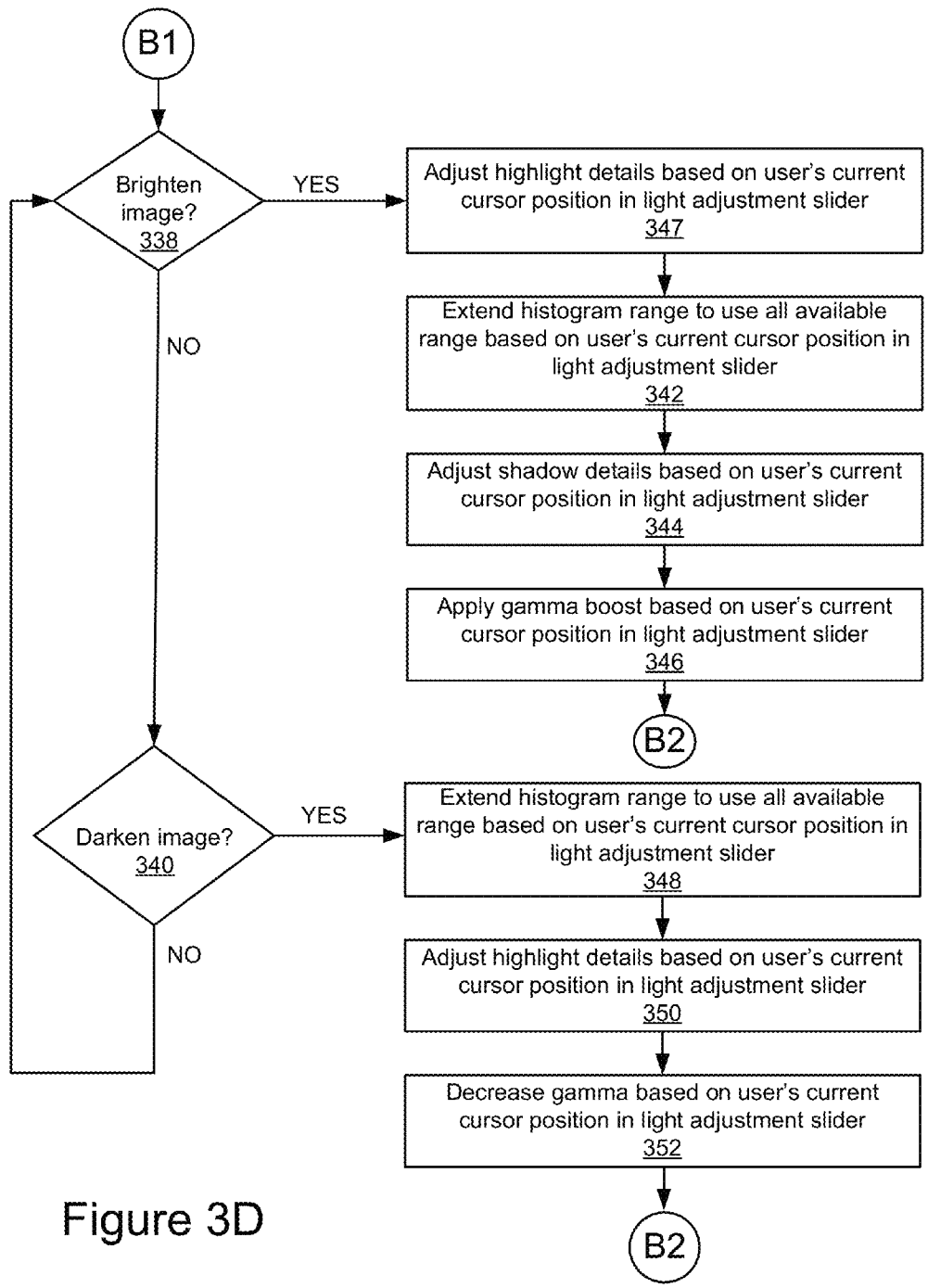
Figure 3E:
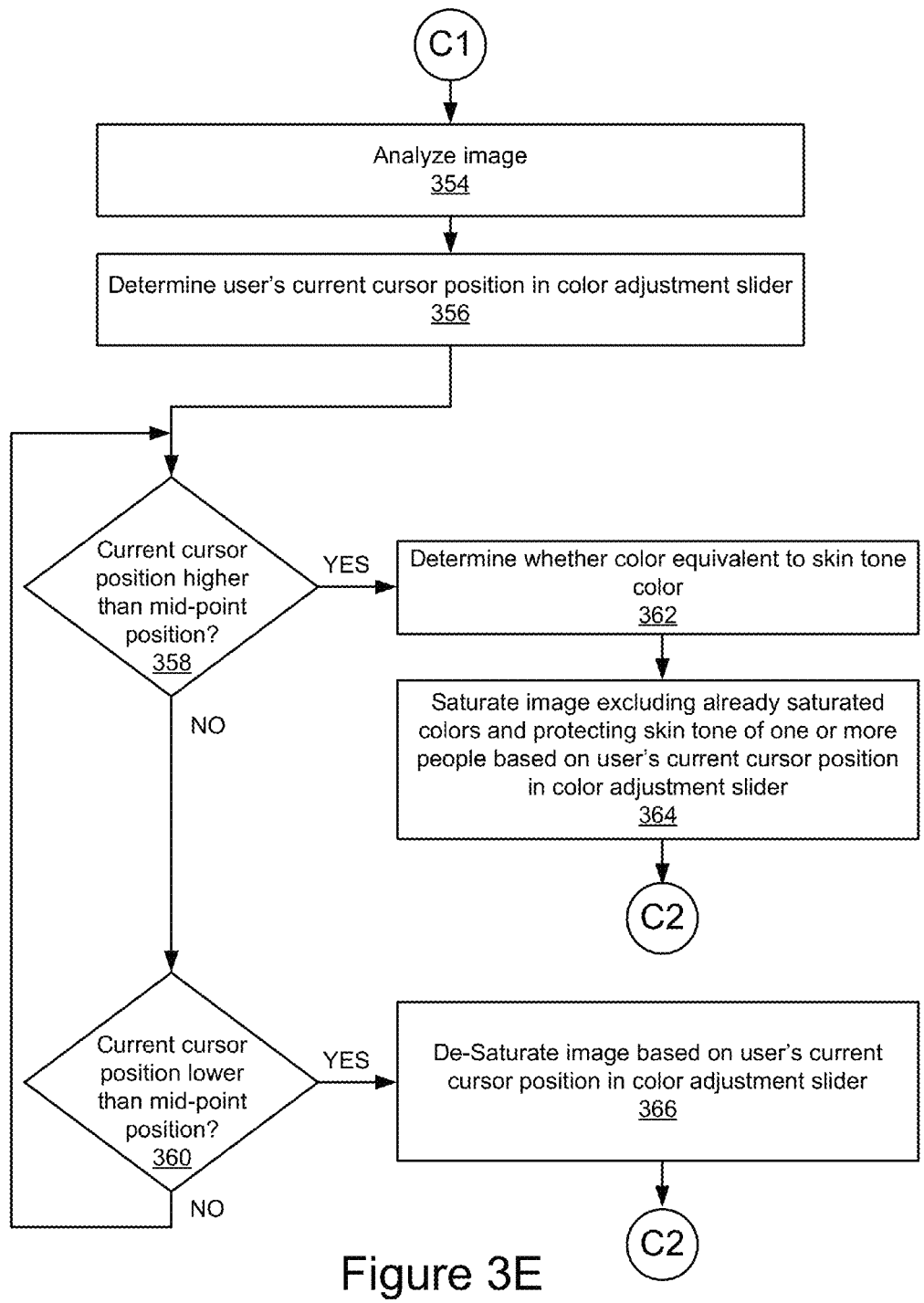
Figure 18:
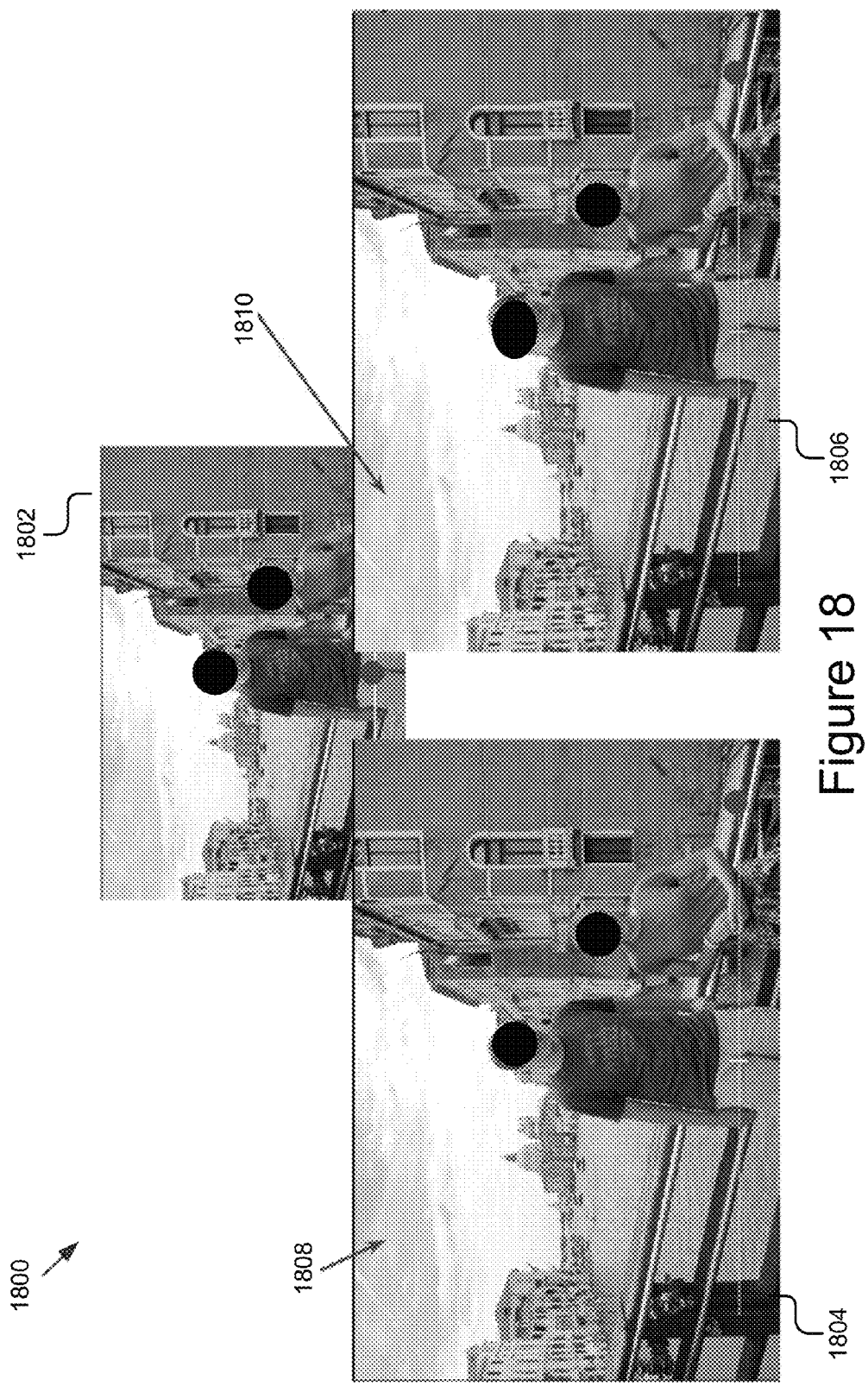
FIG. 18 is an example graphical representation illustrating application of hue constant rendering intent to an example image.

Referring now to FIG. 3A, once the method 300 has performed one or more of the pop effect adjustment, light adjustment, and color adjustment using the pop effect slider 308, the light adjustment slider 310, and the color adjustment slider 312, respectively, the method 300 may then apply 314 any hue constant rendering intent to the image if required, as discussed, for example, with respect to FIG. 18. In some implementations, the operation in block 314 may be performed by the image finalizing module 212 of the image enhancement engine 136.

In some implementations, the method 300 may include an auto-enhance feature. The auto-enhance feature may automatically set the light adjustment, pop effect adjustment, and/or color adjustment to pre-determined values optimized for the needs of a specific image. The pre-determined values may be determined using standard image analysis and compare different versions of the image with different adjustments to identify ideal pre-determined values.

Figure 4:
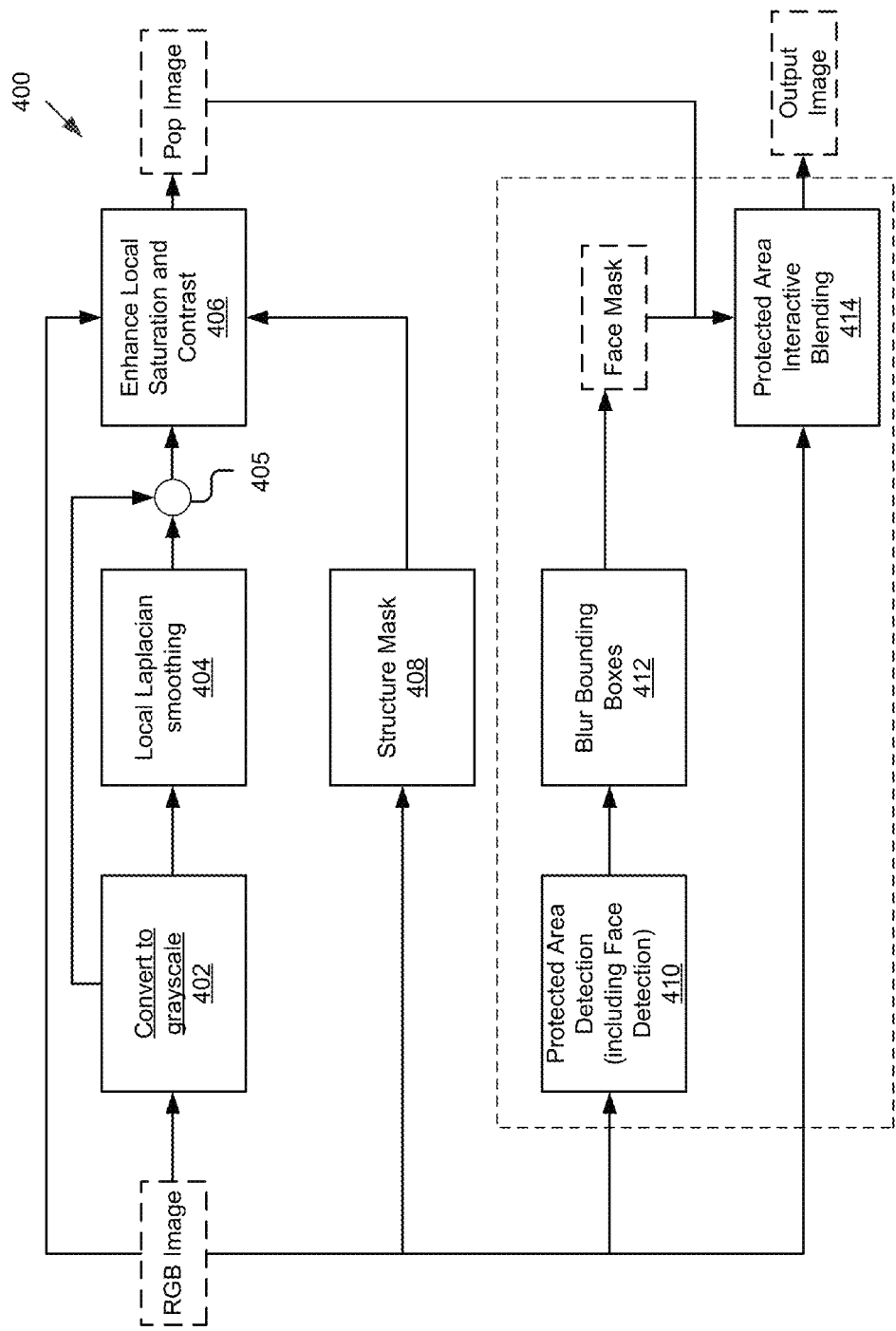
FIG. 4 is an example method for enhancing local contrast and saturation of an image.

FIG. 4 is an example method 400 for enhancing local contrast and saturation of an image using local Laplacian smoothing. The method 400 uses local Laplacians to do an edge-aware smoothing. The method 400 may then find a difference between the original image and the smoothed image, and add back the difference to enhance the details of the image. The enhancement may often be undesirable for faces at high strengths. Therefore, the method 400 may compute a face mask that protects the faces from too much pop. In some implementations, the operations described in method 400 may be performed by the pop effect module 210.

Below is a summary describing some important details of each component depicted in the method 400:

Base Layer:

An image is received and converted 402 to grayscale. Enhancing local contrast and saturation directly via the approximate local Laplacian method may often produce stair-step artifacts. The method 400 may use a local Laplacian pyramid 404 to compute an edge-aware blur on a grayscale image. The difference 405 between the original image and the edge-aware blurred image is then added 406 back to increase the contrast and saturation.

Local Laplacian Smoothing:

As a user, one would expect the following two images to look similar:

Apply pop and resize image smaller (Resized Output)

Resize image smaller and apply pop (Output of Resized Input)

This is especially important in many editing application since a user may edit on a lower resolution (e.g., screen resolution) image, but his/her edits may be applied and saved for the original, high resolution image.

Figure 19:
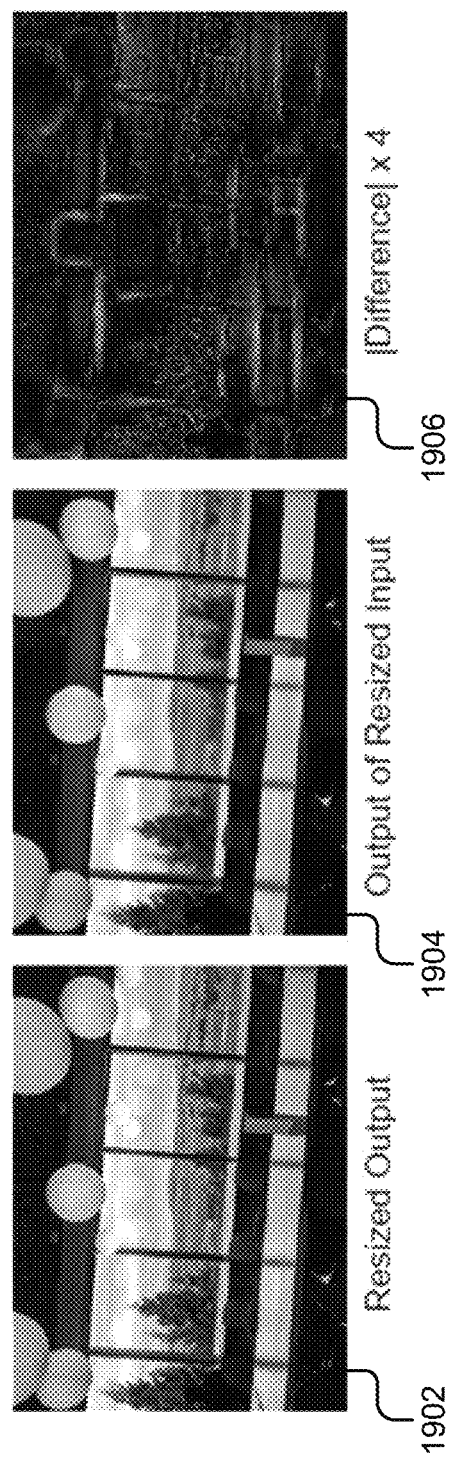
FIG. 19 is an example graphical representation illustrating an instance where a same set of parameters is used.

If the same set of parameters is used, the results will not be the same. An example depicting this scenario is shown in FIG. 19.

While the effect may be difficult to distinguish side-by-side, quickly changing between the two images results in a very noticeable difference. The cause of this unwanted effect is that the number of pyramid levels and the level at which remapping is performed are both fixed. Together, these two parameters select a specific frequency to enhance relative to the original image resolution. Because the two input images have different resolutions, the pyramid will affect different frequencies, resulting in different images.

The method 400 may solve this problem by determining the number of pyramid levels from the image resolution. Ideally, the method 400 may create the pyramids until some fixed, lowest resolution image (e.g., 100×100). An example of two pyramids is shown, for instance, in FIG. 20.

Images may not be always within a factor of two of each other. The method 400 may find the optimal number of pyramid levels to best match some fixed lowest resolution range. The worst-case difference in constructed pyramids is shown, for example, in FIG. 21.

Figure 22:
FIG. 22 is an example graphical representation illustrating selection of different remapping levels.

The method 400 may then choose a remapping level to be a fixed offset from the top of the pyramid (see FIG. 22). This ensures that the same frequency band is processed.

Structure Mask:

The method 400 uses a structure mask 408 so that large regions of small gradients are not enhanced. This helps suppress noise artifacts in the pop effect. The structure mask 408 may be essentially computed by computing the energy in multiple frequency bands using Gabor filters.

Face Mask Protection:

In some instances, the pop effect can be too strong on faces when other areas of an image did not have enough pop applied. Typically, the maximum strength of pop on a face should be ~0.6, whereas the maximum strength if pop is applied elsewhere should be ~1.5.

Figure 23:
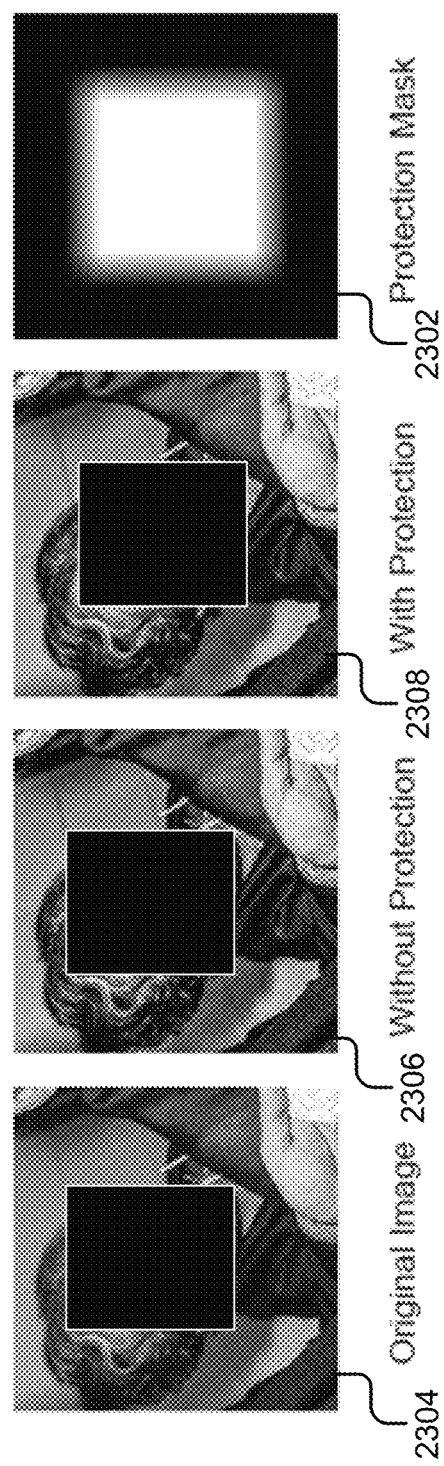
FIG. 23 is an example graphical representation illustrating and example of limiting pop effect.

The method 400 may limit the pop effect on the face by using a protected area, a blurred rectangle around the face, an example for which is shown in FIG. 23.

The protection area may be determined by performing face detection 410 and define those areas detected as the protected area. The protection mask can be computed by blurring 412 blurring bounding boxes, a rectangle with a box filter. However, since the input image is known to only have rectangles, the resulting convolution can be computed in closed form. From signal processing theory, blurring a rectangle with another rectangle will result in a trapezoid. In fact, the value at any point for the output is only dependent on the distance to the rectangle, which can be computed very quickly. Once the face mask has been generated, the pop image and the protected areas are blended 414 to produce the output image.

Figure 5:
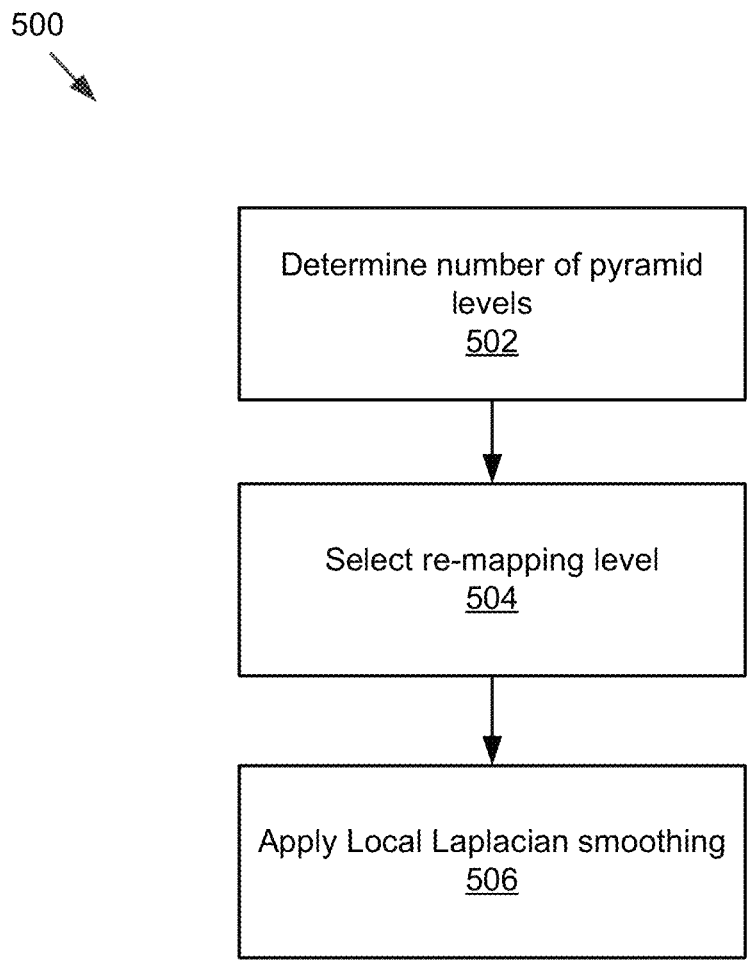
FIG. 5 is an example method for enforcing different resolutions of a same input image to produce similar visual effects.

FIG. 5 is an example method 500 for enforcing different resolutions of a same input image to produce similar visual effects. The method 500 begins by determining 502 an optimal number of pyramid levels to best match some fixed lowest resolution image (e.g., 100×100). The method 500 may select 504 a re-mapping level to be a fixed offset from the top of the pyramid. This ensures that the similar frequency bands are processed for differently-sized images, which eventually produces similar results for different resolution images. Finally, the method 500 may apply 506 local Laplacian smoothing for enhancing local contrast and saturation of an image or in other words apply a pop effect to the image. In some implementations, the operations in blocks 502-504 may be performed by the pop effect module 210.

Graphical Representations

Figure 6A:
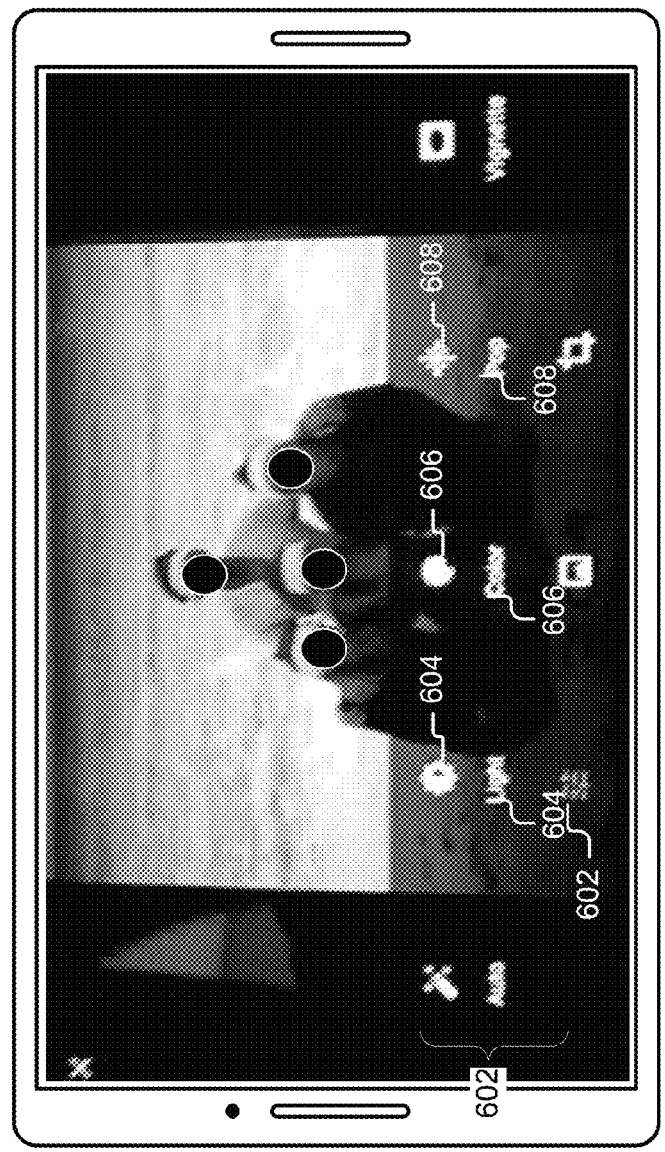
FIGS. 6A-6C are example user interfaces depicting user sliders in action.
Figure 6B:
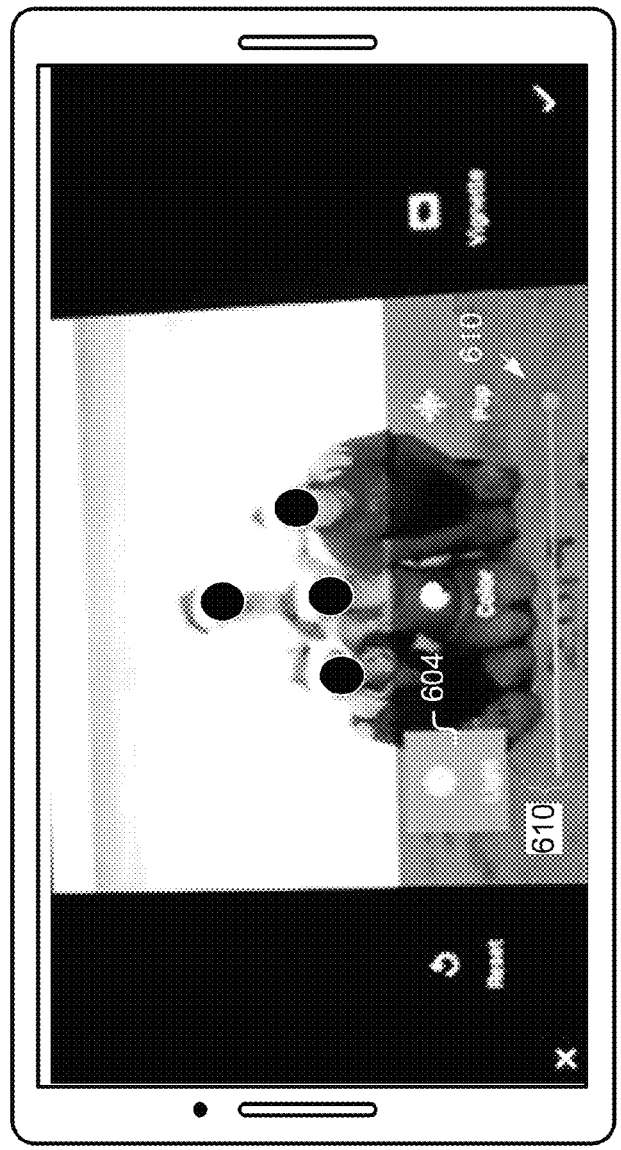
Figure 6C:
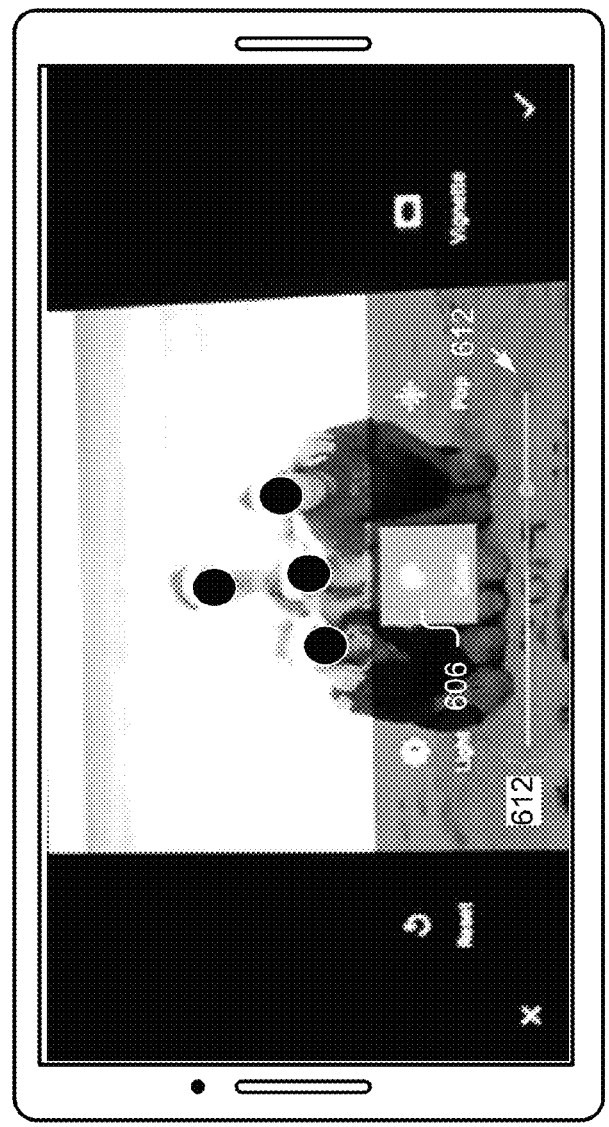

FIGS. 6A-6C are example user interfaces depicting user sliders in action. In particular, FIG. 6A is an example interface depicting a set of options for image enhancement to a user responsive to the user selecting user sliders 602. For instance, as depicted, the user may be provided with an option 604 to adjust light, an option 606 to adjust color, and an option 608 to pop image upon receiving user selection of user sliders 602. FIG. 6B is an example interface depicting a light adjustment slider 610 responsive to user selecting the option 604 to adjust the light or brightness of an image. FIG. 6C is an example interface depicting a color adjustment slider 612 responsive to user selecting the option 606 to adjust the color of an image.

Figure 7:
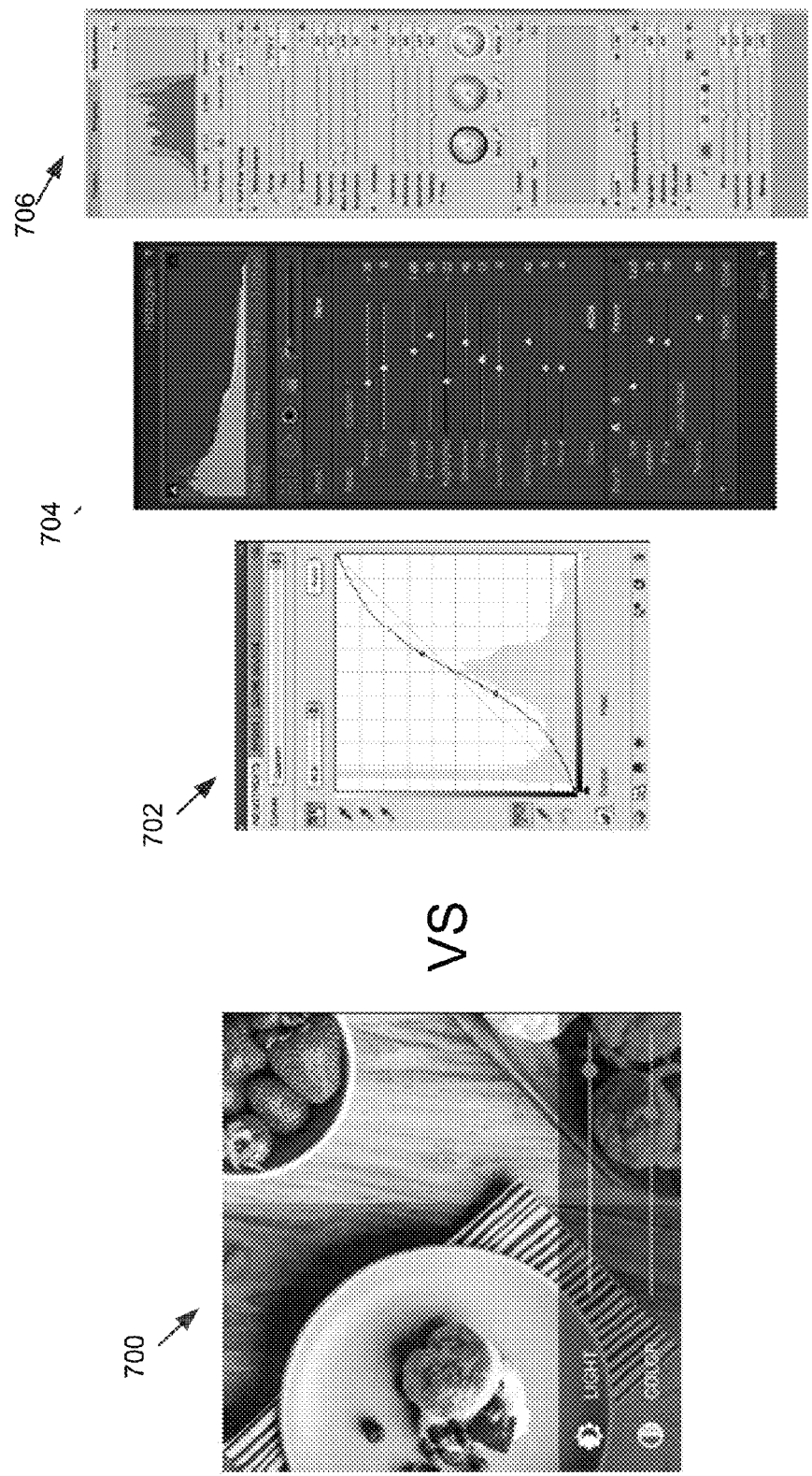
FIG. 7 is a graphical representation comparing the image enhancement method described in this disclosure with prior image enhancement methods.

FIG. 7 is an example graphical representation comparing the image enhancement method described in this disclosure with prior image enhancement methods. As depicted, the image enhancement method described herein just uses two user sliders (e.g., light & color) to achieve a same or better result as shown in the image 702. In contrast, prior image enhancement methods 1, 2, and 3 show in 702, 704, and 706 respectively, provide a myriad of controls or options for adjusting the image. This is advantageous as a novice user may be able to achieve a desired enhancement on an image by just using a light adjustment and a color adjustment slider as compared to what a more experienced or professional user may achieve by adjusting the myriad of controls or options as depicted by the prior image enhancement method 1, prior image enhancement method 2, and/or prior image enhancement method 3.

Figure 8:
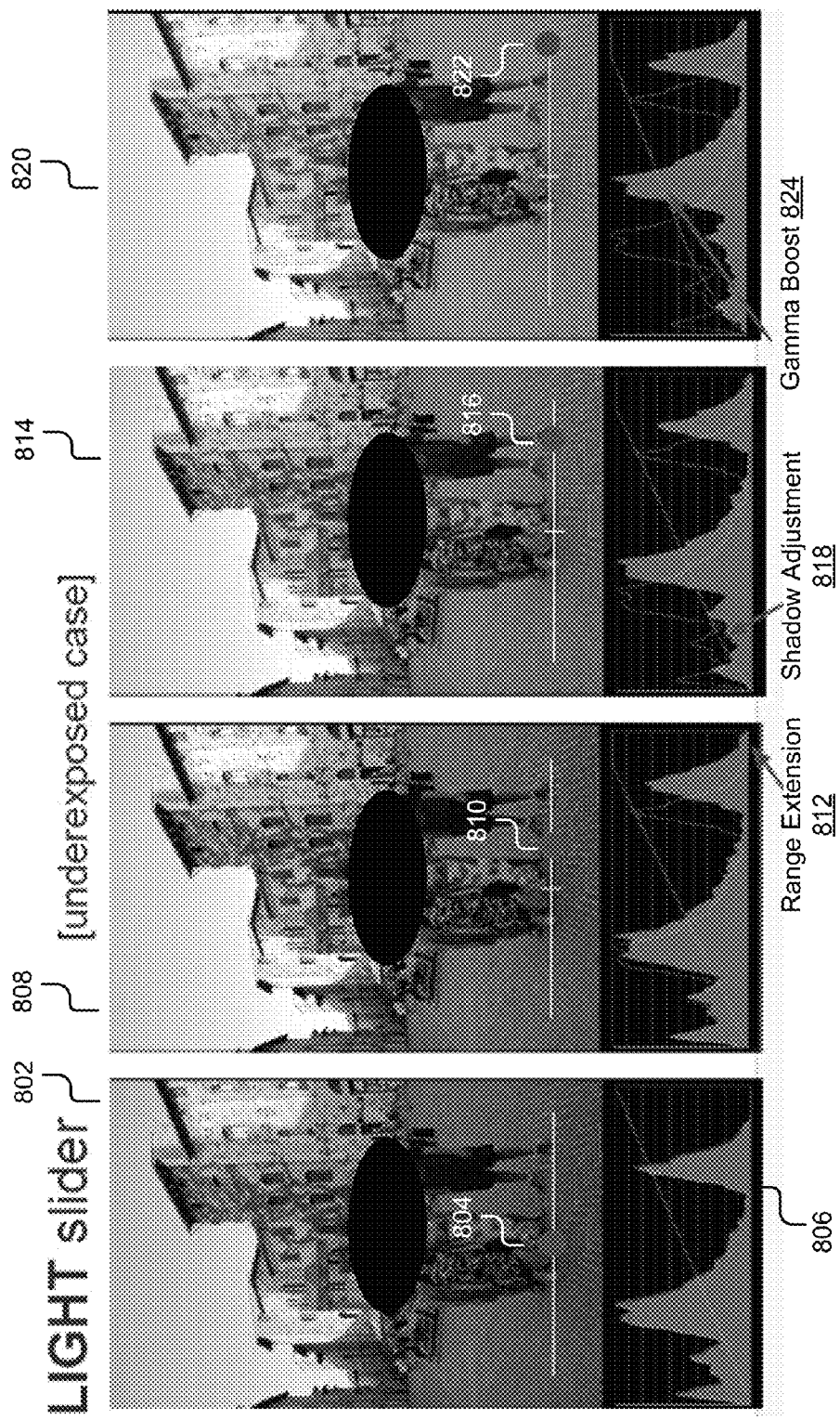
FIG. 8 is a graphical representation illustrating light adjustment slider in action for an example image.

FIG. 8 is an example graphical representation illustrating a light adjustment slider in action for lightening an example image. In particular, interface indicated by reference numeral 802 indicates the default image without any lightening effect applied to the image. This is evidenced by the user's current cursor position 804 being located at the center of the light adjustment slider. The interface 802 also includes a histogram 806 showing distributions based on details of the default image. Interface depicted by reference numeral 808 indicates an increase in brightness in the image based on the cursor position 810 moved to the right from its previous position 804. Also, as evidenced by reference numeral 812, the histogram range is extended so as to widely spread out the distributions and to use all the available range for light adjustment. Interface depicted by reference numeral 814 indicates a further enhancement in brightness of the image based on the current cursor position 816 and shadows automatically being adjusted, as indicated by reference numeral 818, for that enhancement. Lastly, interface indicated by reference numeral 820 indicates a final brightened-up image based on the user's cursor position 822 in the slider moved to its extremity and application of a gamma boost, as indicated by reference numeral 824.

Figure 9:
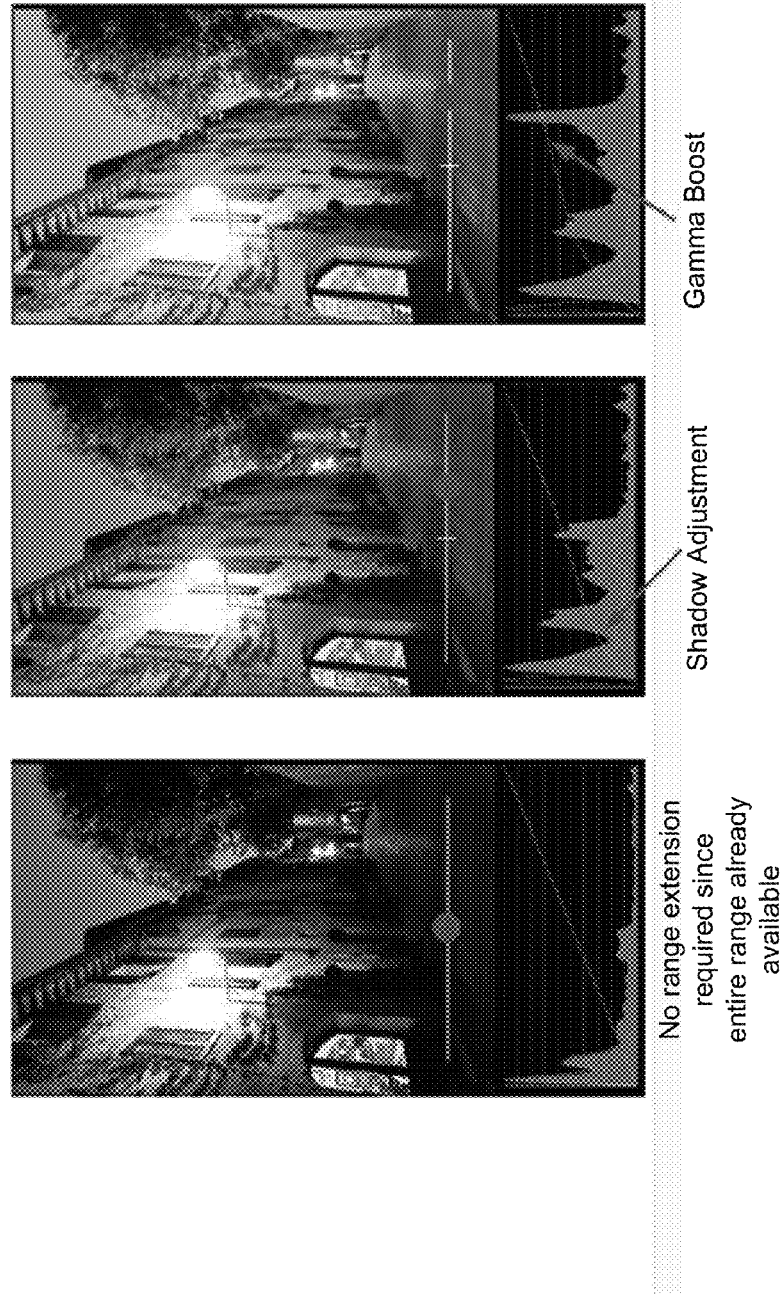
FIG. 9 is a graphical representation illustrating light adjustment slider in action for another example image.

FIG. 9 is a graphical representation illustrating the light adjustment slider in action for another example image. Note that there is no range extension required for this case since the entire range is already available.

Figure 10A:
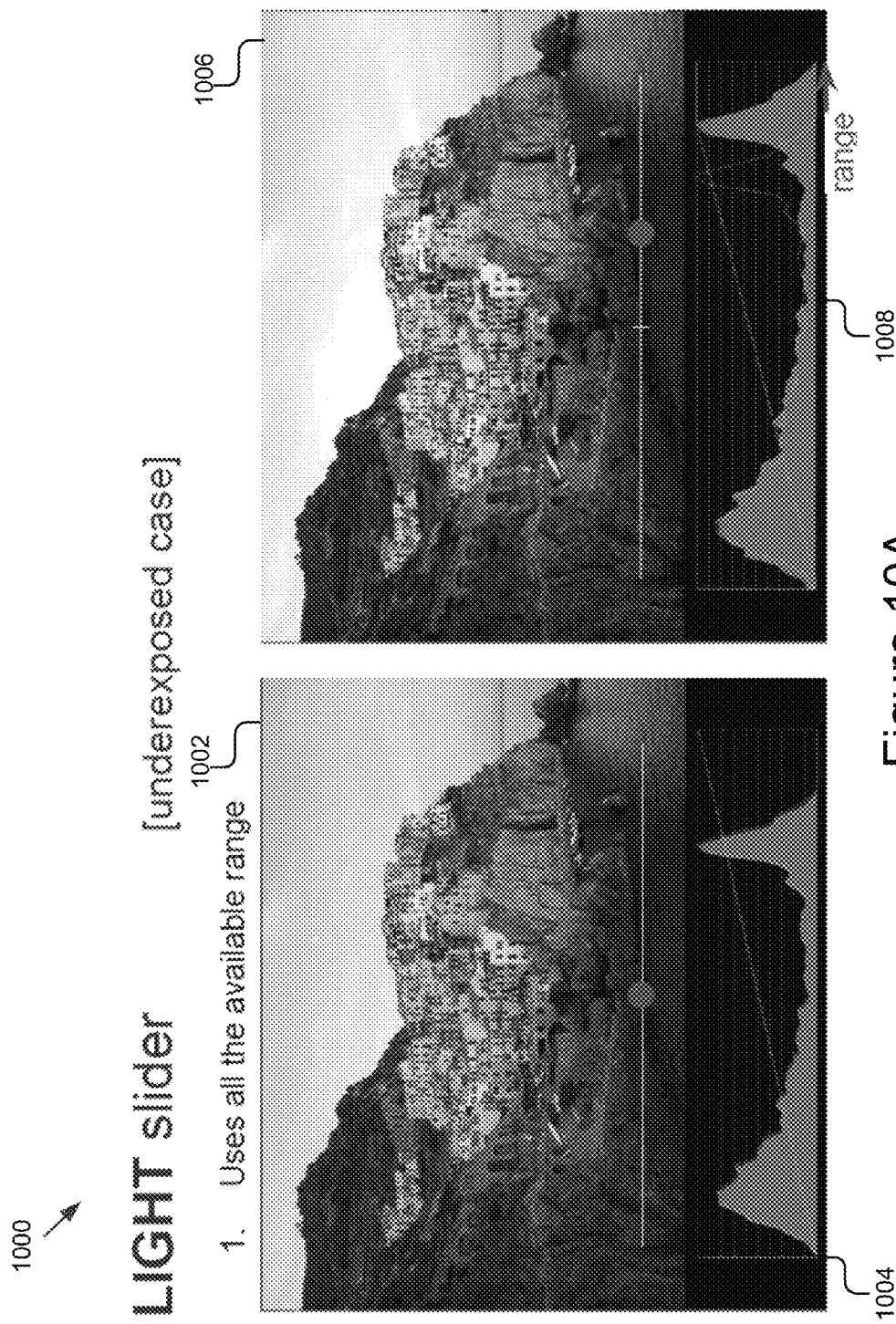
FIGS. 10A and 10B are graphical representations illustrating range extension and shadow details adjustment during operation of a light adjustment slider for an example image.
Figure 10B:
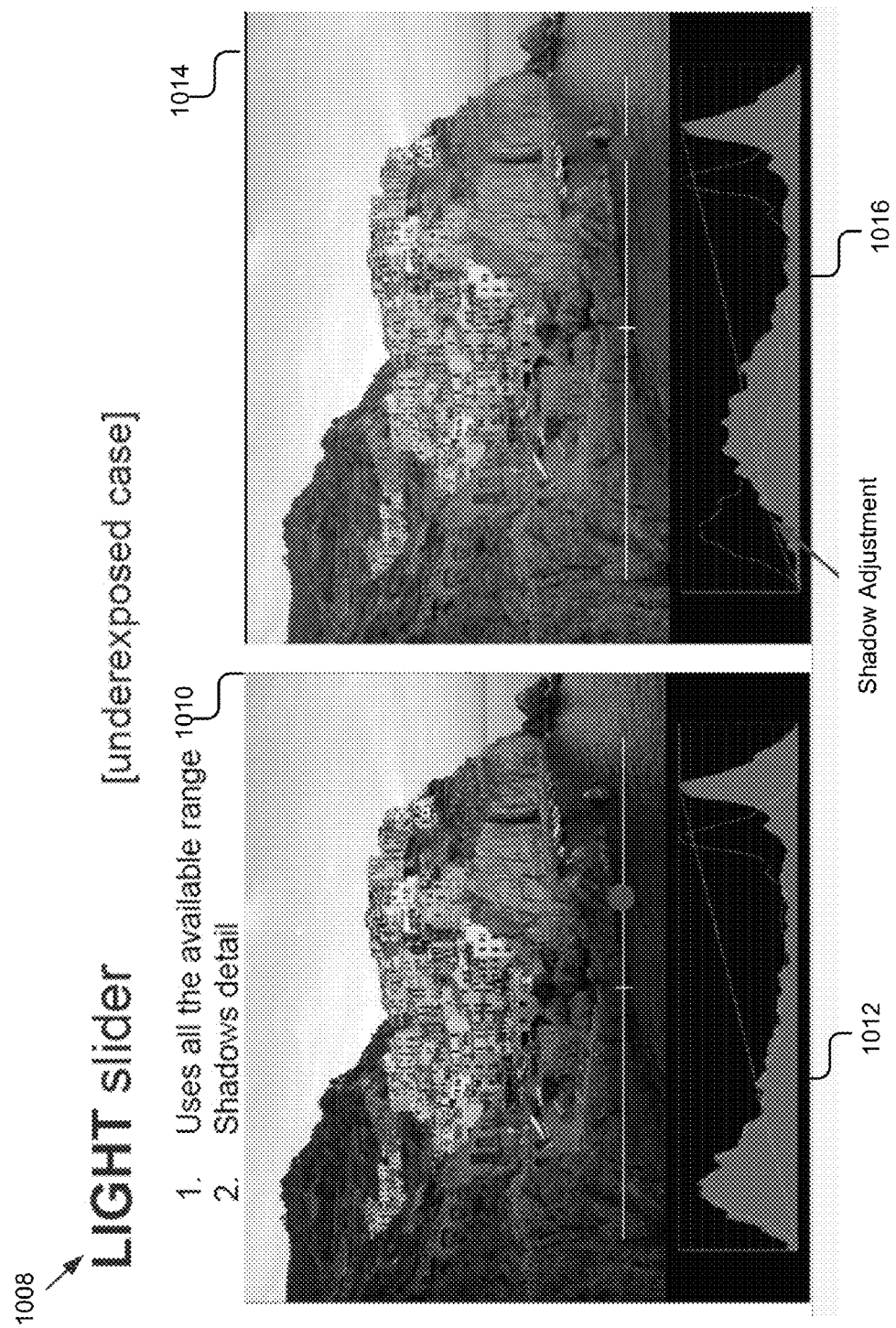

FIGS. 10A and 10B are yet other graphical representations illustrating range extension and shadow details adjustment during operation of a light adjustment slider for an example image. In FIG. 10A, the graphical representation 1000 illustrates changing the range extension. In the image 1002, a range extension 1004 is displayed with a slider in the middle. In the image 1006, a range extension 1008 is displayed with the slider moved to the right of the range extension 1008, enhancing the image 1006 when compared to image 1002. In FIG. 10B, the graphical representation 1008, displays shadow adjustment in example images. In one implementation, example image 1010 includes a shadow adjustment 1012 with the slider positioned in a position to the right of the centerline. Example image 1014 includes a shadow adjustment 1016, with the slider positioned in a position to the far right of the centerline and displaying an enhanced image 1014 when compared to the image 1010.

Figure 11:
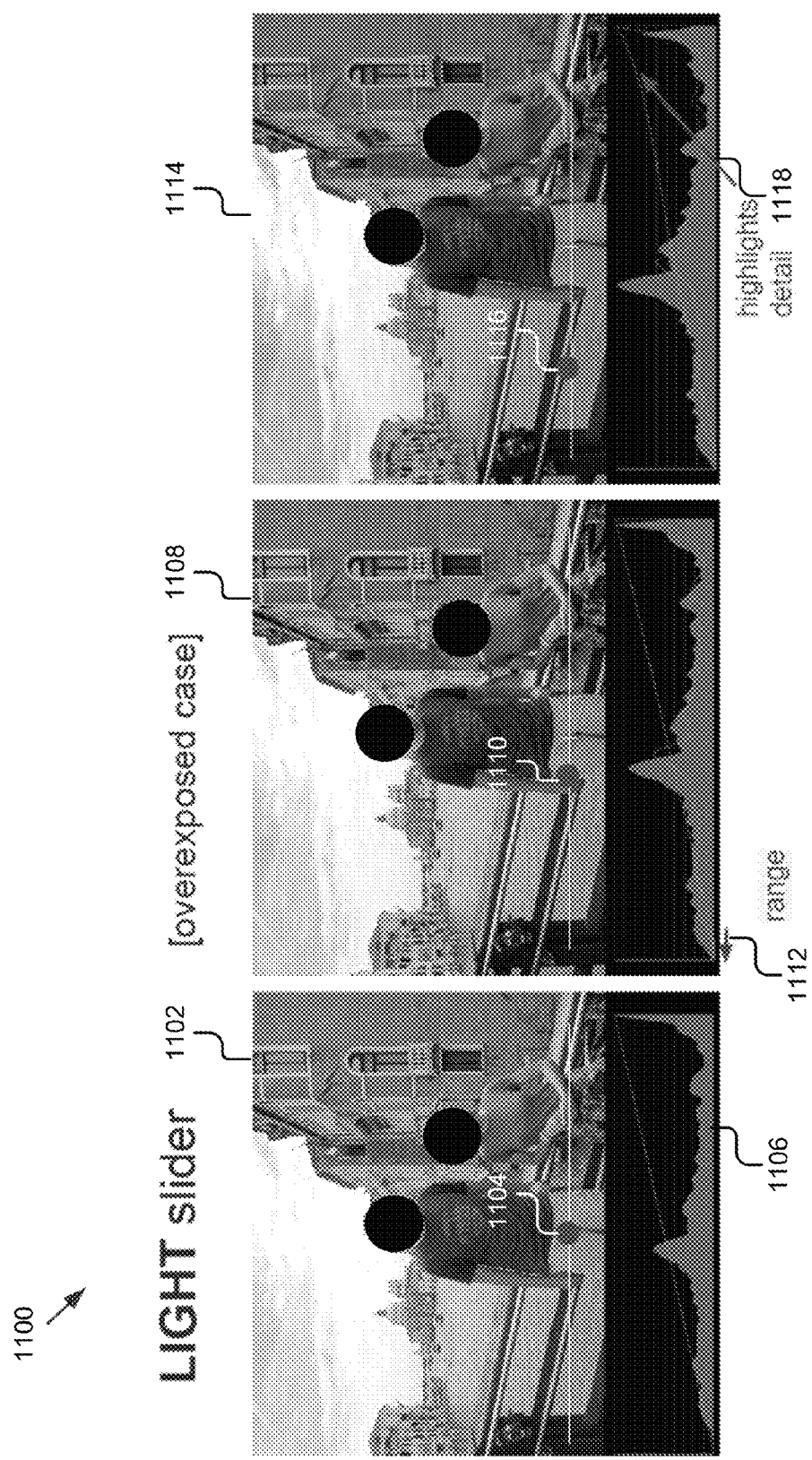
FIG. 11 is a graphical representation illustrating light adjustment slider in action for an example image.

FIG. 11 is a graphical representation 1100 illustrating the light adjustment slider in action for an example image. In particular, interface indicated by reference numeral 1102 indicates the default image without any darkening effect applied to the image. This is evidenced by the user's current cursor position 1104 being located at the center of the light adjustment slider. The interface 1102 also includes a histogram 1106 showing distributions based on details of the default image. Interface depicted by reference numeral 1108 indicates a decrease in brightness or darkening in the image based on the cursor position 1110 moved to left from its previous position 1104. Also, as evidenced by reference numeral 1112, the histogram range is extended so as to widely spread out the distributions and to use all the available range for light adjustment. Interface depicted by reference numeral 1114 indicates a further darkening in the image based on the current cursor position 1116 and highlight details being automatically adjusted, as indicated by reference numeral 1118.

Figure 12:
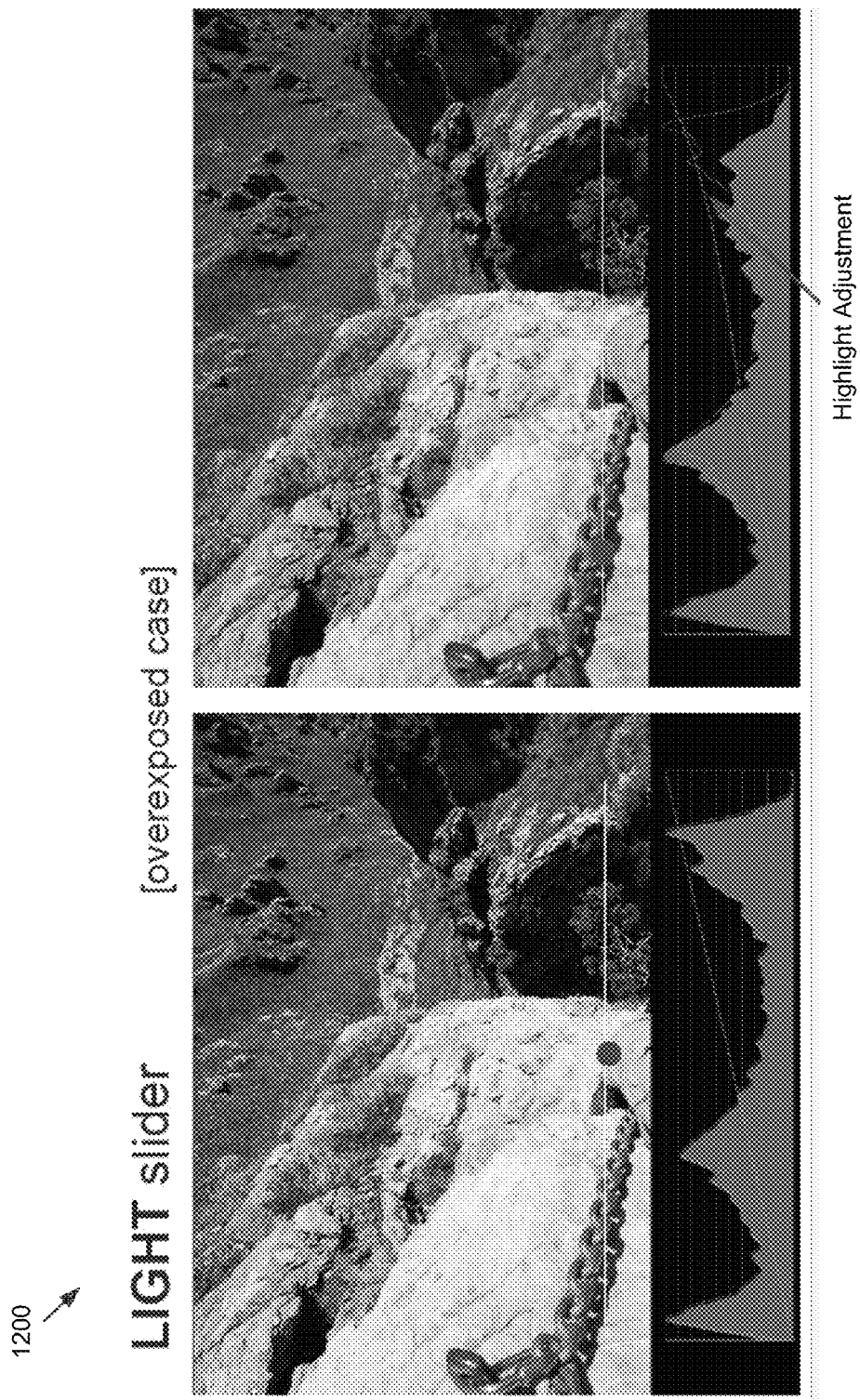
FIG. 12 is a graphical representation illustrating light adjustment slider in action for another example image.

FIG. 12 is a graphical representation 1200 illustrating the light adjustment slider in action for another example image. Note that there is no range extension required for this case (similar to the case discussed with reference to FIG. 9) since the entire range is already available.

Figure 13:
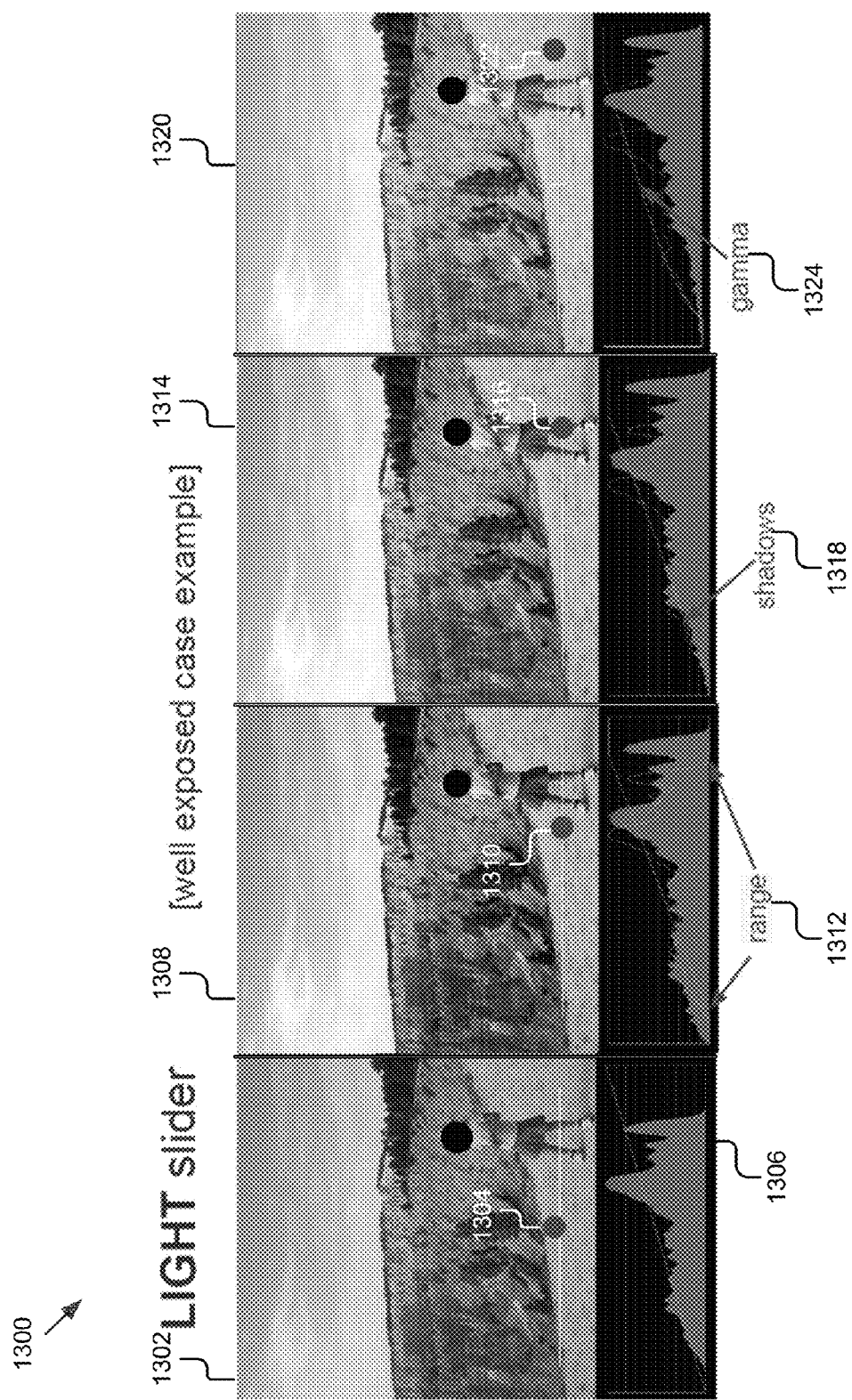
FIG. 13 is an example graphical representation illustrating a light adjustment slider in action for enhancing an example image.

FIG. 13 is an example graphical representation 1300 illustrating a light adjustment slider in action for enhancing an example image. In particular, interface indicated by reference numeral 1302 indicates the default image without any effects or enhancements applied to the image. This is evidenced by the user's current cursor position 1304 being located at the center of the light adjustment slider. The interface 1302, similar to interfaces 802 and 1102, also includes a histogram 1306 showing distributions based on details of the default image. Interface depicted by reference numeral 1308 indicates an increase in brightness in the image based on the cursor position 1310 moved to right from its previous position 1304. Also, as evidenced by reference numeral 1312, the histogram range is extended at both sides so as to widely spread out the distributions and to use all the available range for light adjustment. Interface depicted by reference numeral 1314 indicates a further enhancement in brightness of the image based on the current cursor position 1316 and shadows automatically being adjusted, as indicated by reference numeral 1318. Lastly, interface indicated by reference numeral 1320 indicates a final enhanced image based on the user's cursor position in the slider 1322 moved to its extremity and gamma adjustment, as indicated by reference numeral 1324.

Figure 14:
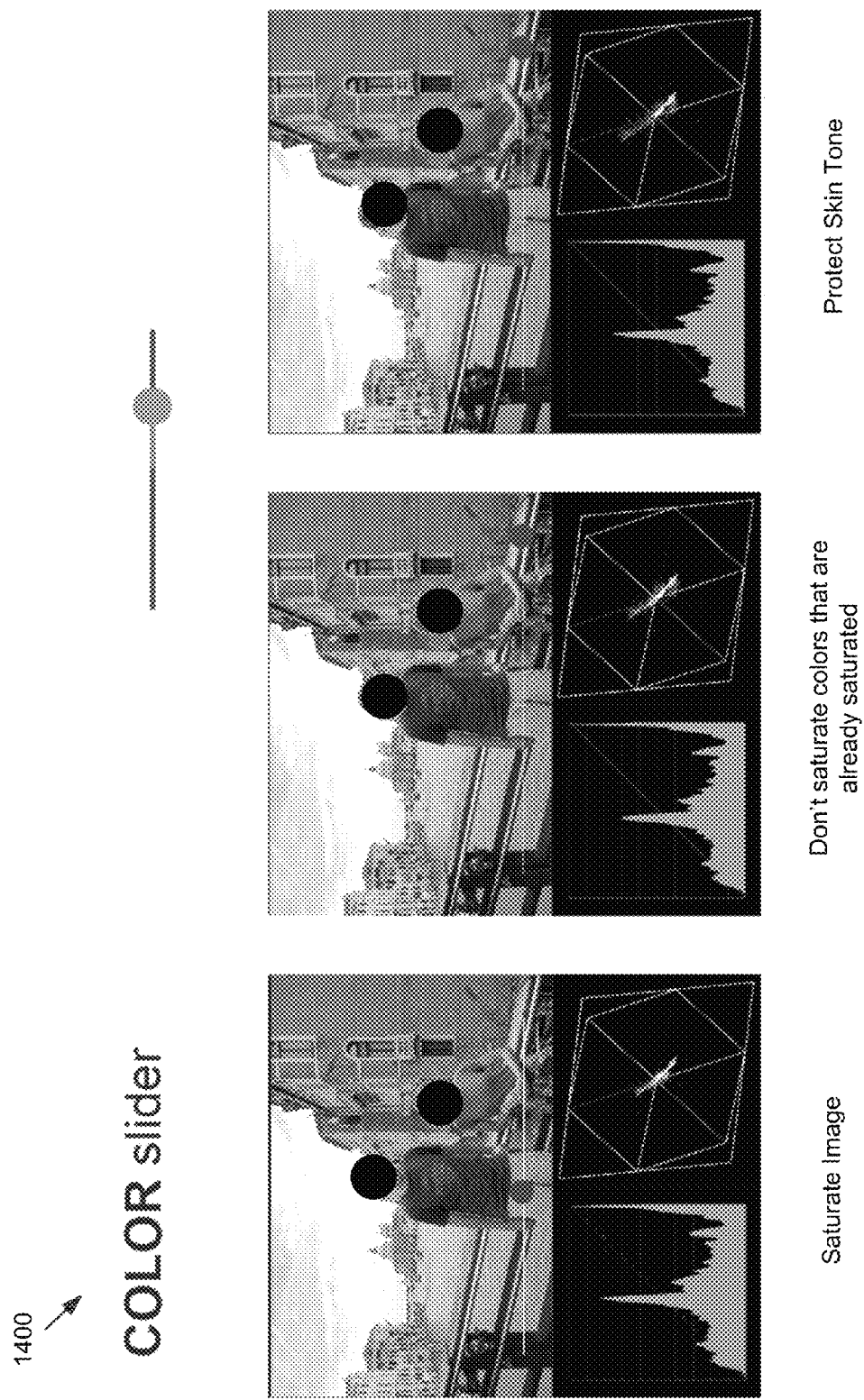
FIG. 14 is an example graphical representation illustrating a color adjustment slider in action for saturating an example image.

FIG. 14 is an example graphical representation 1400 illustrating a color adjustment slider in action for saturating an example image. As depicted, the image is saturated in a way that the skin tone of the people in the image is protected and colors that are already saturated in the image are not saturated again. For example, the image depicted in the figure is saturated in a way that the two people included in the image do not look sunburnt or appear to lose their natural skin tone after saturation is performed on the image.

Figure 15:
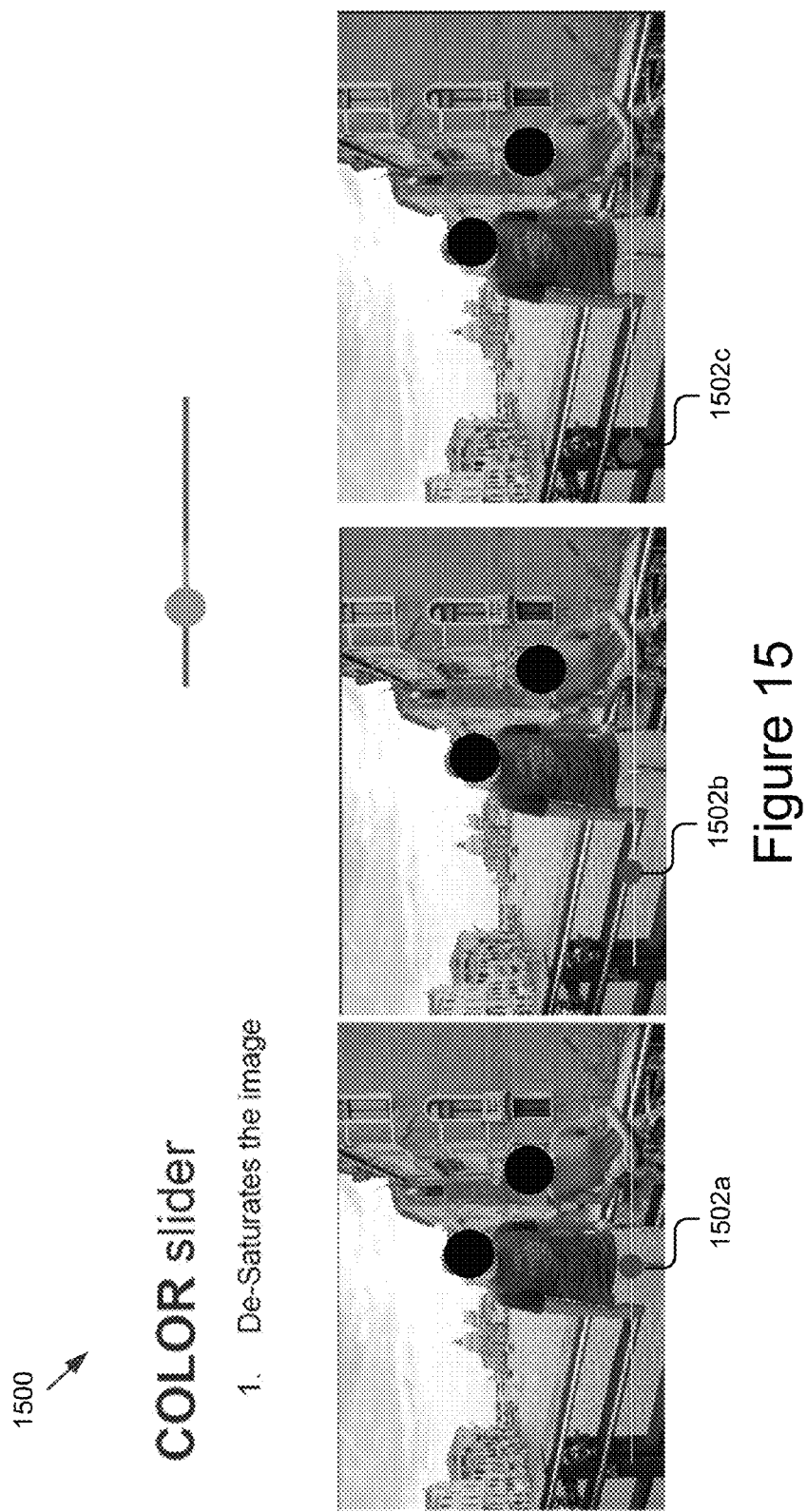
FIG. 15 is an example graphical representation illustrating a color adjustment slider in action for de-saturating an example image.

FIG. 15 is an example graphical representation illustrating a color adjustment slider 1502, in three different positions (1502a-1502c), in action for de-saturating an example image.

Figure 16:
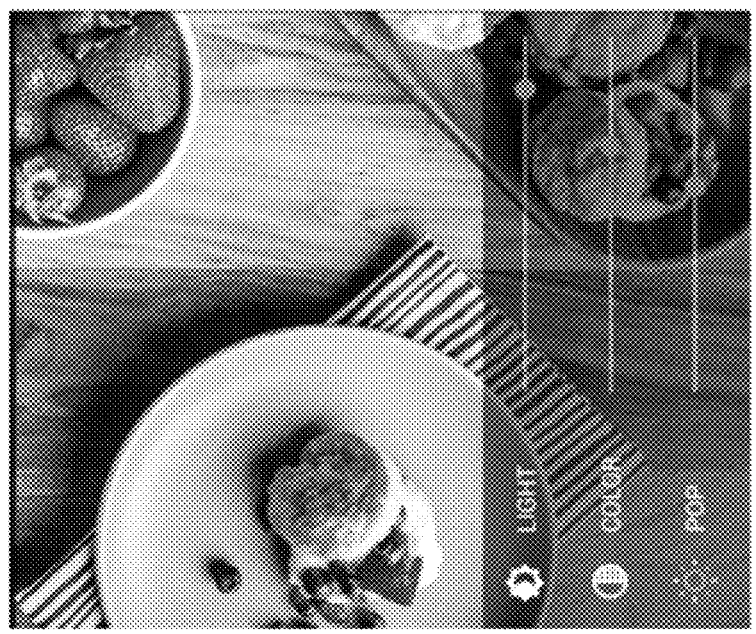
FIG. 16 is an example graphical representation illustrating user sliders including a light adjustment slider, a color adjustment slider, and a pop adjustment slider in action for enhancing an example image.

FIG. 16 is an example graphical representation 1602 illustrating user sliders including a light adjustment slider, a color adjustment slider, and a pop adjustment slider in action for enhancing an example image. As depicted, upon using the pop adjustment slider, the example image's saturation and/or brightness may be boosted if needed and local contrast may be used to further enhance the details of the image.

Figure 17:
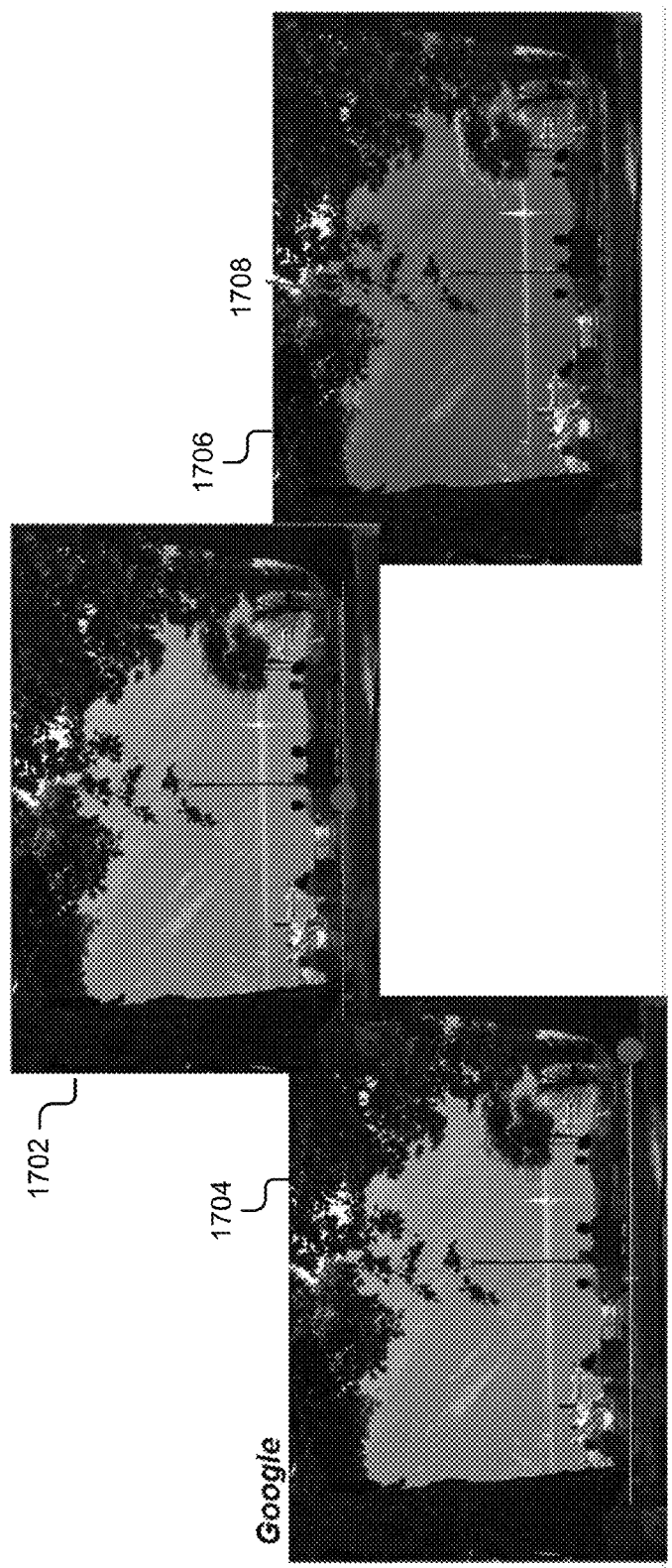
FIG. 17 is an example graphical representation illustrating how luminance is preserved while enhancing an image using one or more of the light adjustment slider, the color adjustment slider, and the pop adjustment slider in comparison to image enhancement by one of the prior methods.

FIG. 17 is an example graphical representation illustrating how luminance is preserved while enhancing the image using one or more of the light adjustment slider, the color adjustment slider, and the pop adjustment slider in comparison to image enhancement by one of the prior methods. Reference numeral 1702 indicates an original image (i.e., image prior to any enhancement). Reference numeral 1704 indicates the same image after being enhanced by the method described in this disclosure and the reference numeral 1706 indicates the same image after being enhanced by a prior enhancement method. As depicted, the hues in the original image, indicated by 1702, are lighter and duller and need to be adjusted. The image enhanced by prior method 1706 makes the sky color in the image way too dark so it become indistinguishable from the water highlighted by arrow 1708 while on the other side the image enhanced by method described herein 1704 makes the color adjustment just about right while keeping the luminance preserved as compared to image 1702 at the same time.

FIG. 18 is an example graphical representation illustrating application of hue constant rendering intent to an example image. Reference numeral 1802 indicates an original image (i.e., image prior to any enhancement). Reference numeral 1804 indicates the same image after being enhanced by a prior enhancement method while reference numeral 1806 indicates the same image after being enhanced by the method described in this disclosure. Notice the undesired hue shift 1808 in the image enhanced by the prior enhancement method versus how it is improved in the image 1810 enhanced by the method described in this disclosure.

FIG. 19 is an example graphical representation showing differences that may be introduced when an output is resized. In one example, a user may receive an image for editing and edit it at a lower resolution. When the edited lower resolution image is resized 1904 and compared to a resized image 1902 edited at a higher resolution, differences 1906 exist between both images. These differences 1906 exist even though the same parameters were applied to the same image, just at different resolutions.

Figure 20:
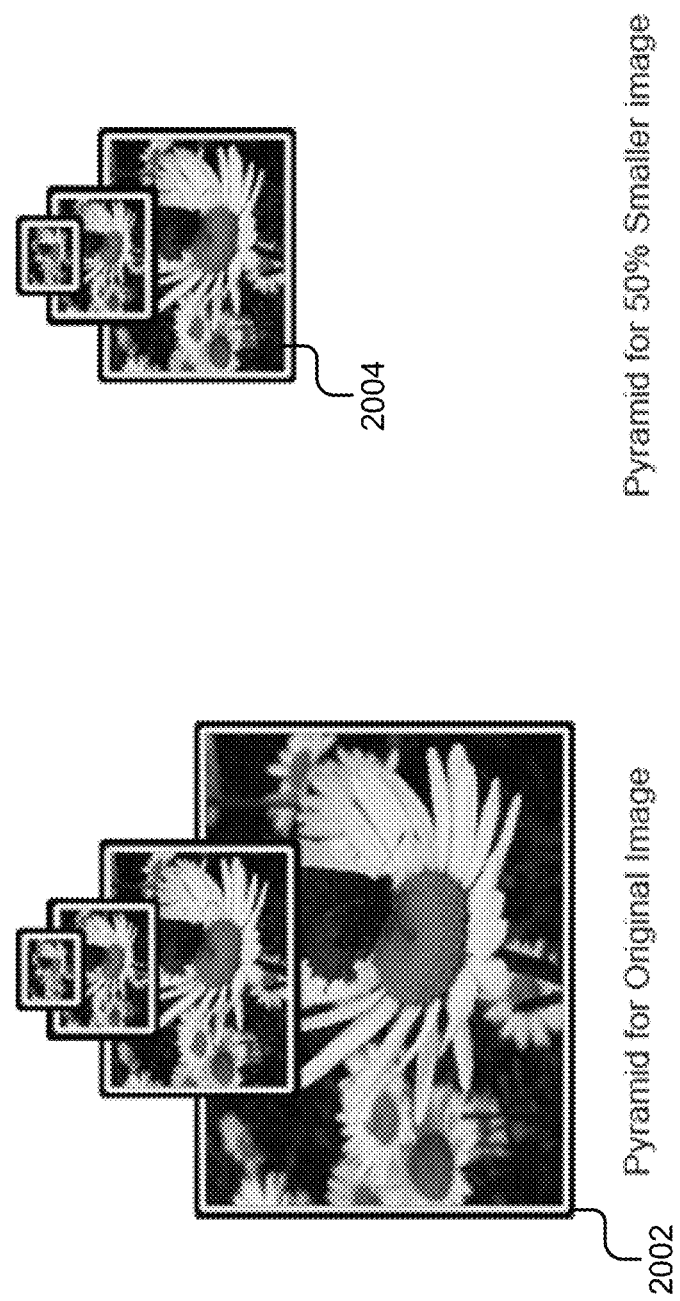
FIG. 20 is an example graphical representation illustrating two pyramids with number of pyramid levels.

FIG. 20 is an example graphical representation of pyramids of the images. The method 400 described in FIG. 4 may determine pyramid levels 2002 from the image resolution. The method 400 in FIG. 4 may create the pyramids until some fixed lowest resolution image. Then the pyramid levels are resized by a factor of two into resized pyramid levels 2004 and the resolution of the pyramids is preserved such that when the resized pyramid levels 2004 are edited and then resized to the original size, the editing is preserved through the resolution, so the resulting image avoids the differences described with respect to FIG. 19.

Figure 21:
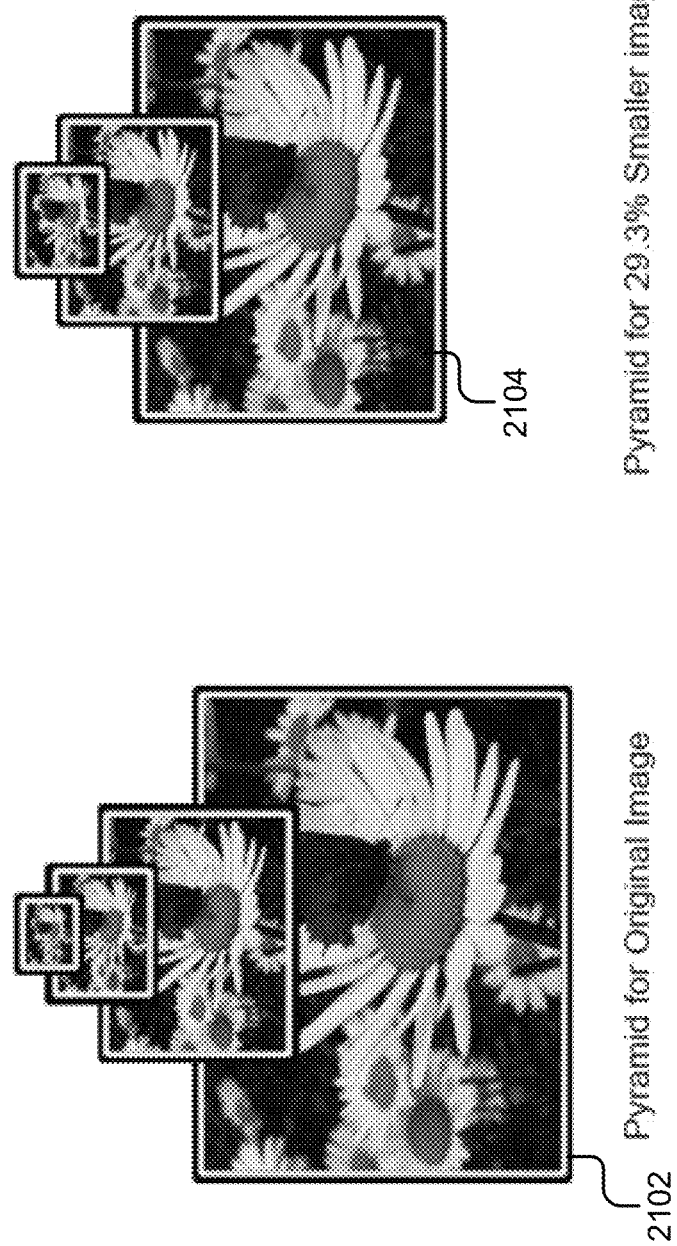
FIG. 21 is an example graphical representation illustrating construction of pyramids.

FIG. 21 is an example graphical representation of pyramids resized at different factors. The method 400 described in FIG. 4 may determine the optimal number of pyramid levels to best match some fixed lowest resolution image. The original pyramid 2102 and a worst-case resized image 2104 are shown where the worst case is determined to be a pyramid 29.3% smaller than the original pyramid 2102.

FIG. 22 is an example graphical representation of remapping levels using the pyramids. The method 400 described in FIG. 4 may determine a remapping level to be a fixed offset from the top of the pyramid. Original pyramid 2202 shows a remapping two levels below the top level. Pyramid 2204 shows the remapping done at a different scaled resolution. Pyramid 2206 shows the remapping done at an alternative scaled resolution. By remapping at a specific level, the remapping ensures that the same frequency band is processed.

FIG. 23 is an example graphical representation of a blurred rectangle used as a protection mask. In the method 400 described in FIG. 4, a blurred rectangle 2302 may be determined based on an identified face in the original image 2304. Image 2306 shows the image with an applied effect without the blurred rectangle 2302 protection mask. Image 2308 displays the blurred rectangle 2302 protection mask being used to protect the identified face in the image 2304 while an effect is applied to the rest of the image 2308.

Reference in the specification to "some implementations" or "an implementation" means that a particular feature, structure, or characteristic described in connection with the implementation is included in at least some instances of the description. The appearances of the phrase "in some implementations" in various places in the specification are not necessarily all referring to the same implementation.

Some portions of the detailed description are presented in terms of processes and symbolic representations of operations on data bits within a computer memory. These process descriptions and representations are the means used by those skilled in the data processing arts to most effectively convey the substance of their work to others skilled in the art. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or implementations containing both hardware and software elements. In some implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the routines and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for modifying an image, the method comprising:
   receiving, using one or more computing devices, an input selecting the image for modification;
   detecting, using the one or more computing devices, a face in the image;
   determining, using the one or more computing devices, a first portion of the image including the face;
   determining, using the one or more computing devices, an enhancement threshold of the first portion of the image;
   providing, using the one or more computing devices, a user slider for modification of the image;
   modifying, using the one or more computing devices, a second portion of the image for image enhancement in response to the user slider being selected to apply an effect, the second portion of the image excluding the first portion;
   modifying, using the one or more computing devices, the first portion of the image for image enhancement without exceeding the enhancement threshold in response to the user slider being selected; and
   storing, using the one or more computing devices, the modified image.

2. The computer-implemented method of claim 1, wherein the effect is a pop effect, the user slider controls the pop effect, and the method further comprises:
   determining, using the one or more computing devices, an amount of the pop effect to apply to the image based on the user slider;
   adjusting, using the one or more computing devices, the image by applying the pop effect to the first portion of the image; and
   applying, using the one or more computing devices, the pop effect to the second portion of the image based on the user slider.

3. The computer-implemented method of claim 2, wherein the pop effect includes one of the group of a saturation boost, a brightness adjustment, and use of a local contrast to enhance details of the image.

4. The computer-implemented method of claim 1, wherein the effect is a light adjustment, the user slider controls the light adjustment to the image, and the method further comprises:
   extending, using the one or more computing devices, a histogram range to include an available range for the light adjustment and to spread out distributions based on a desired light adjustment amount selected using the user slider;
   adjusting, using the one or more computing devices, a shadow associated with the image based on the desired light adjustment amount; and
   adjusting, using the one or more computing devices, gamma associated with the image based on the desired light adjustment amount.

5. The computer-implemented method of claim 1, wherein the effect is a light adjustment, the user slider controls the light adjustment to the image, and the method further comprises:
   extending, using the one or more computing devices, a histogram range to include an available range for the light adjustment and to spread out distributions based on a desired light adjustment amount selected using the user slider;
   adjusting, using the one or more computing devices, highlight details associated with the image based on the desired light adjustment amount; and
   adjusting, using the one or more computing devices, gamma associated with the image based on the desired light adjustment amount.

6. The computer-implemented method of claim 1, wherein the effect is a color adjustment, the user slider controls the color adjustment to the image, and the method further comprises:
   determining, using the one or more computing devices, a color in the image that is saturated; and
   saturating, using the one or more computing devices, the second portion of the image based on a color adjustment amount selected using the user slider.

7. The computer-implemented method of claim 1, wherein the modification is resizing the image into a fixed lower resolution image, and the method further comprises:
   determining, using the one or more computing devices, a number of pyramid levels to match a pre-defined fixed lower resolution image;
   selecting, using the one or more computing devices, a remapping level to be a fixed offset from a top level of the pyramid levels; and
   applying, using the one or more computing devices, a local Laplacian smoothing to ensure similar frequency bands are processed for differently-sized images to produce similar visual results for the fixed lower resolution image.

8. The computer implemented method of claim 1, wherein providing the user slider for the modification of the image includes providing a user interface, the user interface including a pop slider, a color slider, a light slider, and a preview of the image.

9. A computer program product comprising a non-transitory computer usable medium including a computer program, wherein the computer program when executed on a computer causes the computer to:
   receive an input selecting an image for modification;
   determine a face in the image;
   determine a first portion of the image including the face;
   determine an enhancement threshold of the first portion of the image;

provide a user slider for modification of the image;
modify a second portion of the image for image enhancement in response to the user slider being selected to apply an effect, the second portion of the image excluding the first portion;
modify the first portion of the image for image enhancement without exceeding the enhancement threshold in response to the user slider being selected; and
store the modified image.

10. The computer program product of claim 9, wherein the effect is a pop effect, the user slider controls the pop effect, and the computer program when executed on the computer further causes the computer to:
determine an amount of the pop effect to apply to the image based on the user slider;
adjust the image by applying the pop effect to the first portion of the image; and
apply the pop effect to the second portion of the image based on the user slider.

11. The computer program product of claim 10, wherein the pop effect includes one from the group of a saturation boost, a brightness adjustment, and use of a local contrast to enhance details of the image.

12. The computer program product of claim 9, wherein the effect is a light adjustment, the user slider controls the light adjustment to the image, and the computer program when executed on the computer further causes the computer to:
extend a histogram range to include an available range for the light adjustment and to spread out distributions based on a desired light adjustment amount selected using the user slider;
adjust a shadow associated with the image based on the desired light adjustment amount; and
adjust gamma associated with the image based on the desired light adjustment amount.

13. The computer program product of claim 9, wherein the effect is a light adjustment, the user slider controls the light adjustment to the image, and the computer program when executed on the computer further causes the computer to:
extend a histogram range to include an available range for the light adjustment and to spread out distributions based on a desired light adjustment amount selected using the user slider;
adjust highlight details associated with the image based on the desired light adjustment amount; and
adjust gamma associated with the image based on the desired light adjustment amount.

14. The computer program product of claim 9, wherein the effect is a color adjustment, the user slider controls the color adjustment to the image, and the computer program when executed on the computer further causes the computer to:
determine a color in the image that is saturated; and
saturate the second portion of the image based on a color adjustment amount selected using the user slider.

15. The computer program product of claim 9, wherein the modification is resizing the image into a fixed lower resolution image, the computer program when executed on the computer further causes the computer to:
determine a number of pyramid levels to match a predefined fixed lower resolution image;
select a remapping level to be a fixed offset from a top level of the pyramid levels; and
apply a local Laplacian smoothing to ensure similar frequency bands are processed for differently-sized images to produce similar visual results for the fixed lower resolution image.

16. The computer program product of claim 9, wherein to provide the user slider for the modification of the image, the computer program when executed on the computer further causes the computer to provide a user interface, the user interface including a pop slider, a color slider, a light slider, and a preview of the image.

17. A system comprising:
a processor; and
a memory storing instructions that, when executed, cause the system to:
receive an input selecting an image for modification;
determine a face in the image;
determine a first portion of the image including the face;
determine an enhancement threshold of the first portion of the image;
provide a user slider for modification of the image;
modify a second portion of the image for image enhancement in response to the user slider being selected to apply an effect, the second portion of the image excluding the first portion;
modify the first portion of the image for image enhancement without exceeding the enhancement threshold in response to the user slider being selected; and
store the modified image.

18. The system of claim 17, wherein the effect is a pop effect, the user slider controls the pop effect, and the memory stores further instructions that, when executed, cause the system to:
determine an amount of the pop effect to apply to the image based on the user slider;
adjust the image by applying the pop effect to apply to the first portion of the image; and
apply the pop effect to the second portion of the image based on the user slider.

19. The system of claim 18, wherein the pop effect includes one from the group of a saturation boost, a brightness adjustment, and use of a local contrast to enhance details of the image.

20. The system of claim 17, wherein the effect is a light adjustment slider, the user slider controls the light adjustment to the image, and the memory stores further instructions that, when executed, cause the system to:
extend a histogram range to include an available range for the light adjustment and to spread out distributions based on a desired light adjustment amount selected using the user slider;
adjust a shadow associated with the image based on the desired light adjustment amount; and
adjust gamma associated with the image based on the desired light adjustment amount.

21. The system of claim 17, wherein the effect is a light adjustment slider, the user slider controls the light adjustment to the image, and the memory stores further instructions that, when executed, cause the system to:
extend a histogram range to include an available range for the light adjustment and to spread out distributions based on a desired light adjustment amount selected using the user slider;
adjust highlight details associated with the image based on the desired light adjustment amount; and adjust gamma associated with the image based on the desired light adjustment amount.

22. The system of claim 17, wherein the effect is a color adjustment, the user slider controls the color adjustment to the image, and the memory stores further instructions that, when executed, cause the system to:
determine a color in the image that is saturated; and
saturate the second portion of the image based on a color adjustment amount selected using the user slider.

23. The system of claim 17, wherein the modification is resizing the image into a fixed lower resolution image, and the memory stores further instructions that, when executed, cause the system to:
determine a number of pyramid levels to best match a pre-defined fixed lower resolution image;
select a remapping level to be a fixed offset from a top level of the pyramid levels; and
apply a local Laplacian smoothing to ensure similar frequency bands are processed for differently-sized images to produce similar visual results for the fixed lower resolution image.

24. The system of claim 17, wherein to provide the user slider for the modification of the image, the memory stores further instructions that, when executed, cause the system to provide a user interface, the user interface including a pop slider, a color slider, a light slider, and a preview of the image.

* * * * *